(12) United States Patent
Filsfils et al.

(10) Patent No.: US 11,838,200 B2
(45) Date of Patent: Dec. 5, 2023

(54) PACKET NETWORK INTERWORKING INCLUDING SEGMENT ROUTING

(71) Applicant: Cisco Technology, Inc., San Jose, CA (US)

(72) Inventors: Clarence Filsfils, Brussels (BE); Swadesh Agrawal, San Jose, CA (US); Zafar Ali, Hicksville, NY (US); Pablo Camarillo Garvia, Madrid (ES); Francois Clad, Strasbourg (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/448,695

(22) Filed: Sep. 23, 2021

(65) Prior Publication Data

US 2022/0014460 A1    Jan. 13, 2022

Related U.S. Application Data

(63) Continuation of application No. 16/659,484, filed on Oct. 21, 2019, now Pat. No. 11,134,002.

(Continued)

(51) Int. Cl.
*H04L 45/02* (2022.01)
*H04L 45/741* (2022.01)

(52) U.S. Cl.
CPC ............ *H04L 45/04* (2013.01); *H04L 45/741* (2013.01)

(58) Field of Classification Search
CPC ....... H04L 45/04; H04L 45/741; H04L 45/34; H04L 45/50; H04L 45/52
See application file for complete search history.

(56) References Cited

U.S. PATENT DOCUMENTS 8,848,702 B2    9/2014  Troan et al.
9,491,058 B2    11/2016 Filsfils et al.
(Continued)

FOREIGN PATENT DOCUMENTS

CN    107872388 A    4/2018
CN    105075195 B    12/2018
(Continued)

OTHER PUBLICATIONS

S. Agrawal et al., "SRv6 and MPLS interworking," draft-agrawal-spring-srv6-mpls-interworking-00, Oct. 22, 2018, The Internet Society, Reston, VA, USA (nine pages).

(Continued)

*Primary Examiner* — Jung H Park
(74) *Attorney, Agent, or Firm* — Polsinelli

(57) ABSTRACT

In one embodiment, a network comprises a first forwarding domain using a first data plane forwarding protocol and a second forwarding domain using a second data plane forwarding protocol different than the first data forwarding plane forwarding protocol. The first forwarding domain includes a first path node and a particular border node. The second forwarding domain includes a second path node and the particular border node. The particular border node performs Segment Routing or other protocol interworking between the different data plane forwarding domains, such as for transporting packets through a different forwarding domain or translating a packet to use a different data forwarding protocol. These forwarding domains typically include Segment Routing (SR) and SR-Multiprotocol Label Switching (SR-MPLS). Paths through the network are determined by a Path Computation Engine and/or based on route advertisements such associated with Binding Segment Identifiers (BSIDs) (e.g., labels, Internet Protocol version 6 addresses).

27 Claims, 24 Drawing Sheets

Related U.S. Application Data

(60) Provisional application No. 62/749,118, filed on Oct. 22, 2018.

(56) References Cited

U.S. PATENT DOCUMENTS

| | | | |
|---|---|---|---|
| 9,537,769 | B2 | 1/2017 | Bryant et al. |
| 9,749,187 | B2 | 8/2017 | Filsfils et al. |
| 9,762,488 | B2 | 9/2017 | Previdi et al. |
| 10,015,092 | B2 | 7/2018 | Troan et al. |
| 10,069,725 | B1 | 9/2018 | Talur et al. |
| 10,491,720 | B2 | 11/2019 | Brissette et al. |
| 10,506,083 | B2 | 12/2019 | Filsfils et al. |
| 10,516,610 | B2 | 12/2019 | Filsfils et al. |
| 10,932,136 | B2 * | 2/2021 | Filsfils ............... H04W 16/02 |
| 11,012,350 | B2 | 5/2021 | Filsfils et al. |
| 2012/0213220 | A1 | 8/2012 | Troan et al. |
| 2015/0009863 | A1 | 1/2015 | Troan et al. |
| 2016/0366052 | A1 | 12/2016 | Chapman et al. |
| 2019/0288873 | A1 | 9/2019 | Camarillo Garvia et al. |
| 2019/0394211 | A1 | 12/2019 | Filsfils et al. |
| 2020/0128469 | A1 | 4/2020 | Akhavain Mohammadi |
| 2020/0358698 | A1 * | 11/2020 | Song ............... H04L 45/50 |
| 2021/0021513 | A1 | 1/2021 | Filsfils et al. |
| 2021/0029033 | A1 * | 1/2021 | Chen ............... H04L 45/302 |
| 2021/0044538 | A1 * | 2/2021 | Hu ............... H04L 47/724 |

FOREIGN PATENT DOCUMENTS

| | | |
|---|---|---|
| WO | 2014/144216 A1 | 9/2014 |
| WO | 2021/011392 A1 | 1/2021 |

OTHER PUBLICATIONS

Y. Rekhter and E. Rosen, "Carrying Label Information in BGP-4," RFC 3107, May 2001, The Internet Society, Reston, VA, USA (eight pages).

Protocol Numbers, https://www.iana.org/assignments/protocol-numbers/protocol-numbers.txt, Oct. 13, 2017, Internet Assigned Numbers Authority (IANA), Marina del Rey, CA, USA (seven pages).

Rekhter et al., "A Border Gateway Protocol 4 (BGP-4)," RFC 4271, Jan. 2006, The Internet Society, Reston, VA, USA (104 pages).

Bates et al., "Multiprotocol Extensions for BGP-4," RFC 2283, Feb. 1998, The Internet Society, Reston, VA, USA (nine pages).

T. Bates et al., "Multiprotocol Extensions for BGP-4," RFC 4760, Jan. 2007, The Internet Society, Reston, VA, USA (twelve pages).

Rosen et al., "Multiprotocol Label Switching Architecture," RFC 3031, Jan. 2001, The Internet Society, Reston, VA, USA (sixty one pages).

"Information technology—Telecommunications and information exchange between systems—Intermediate System to Intermediate System intra-domain routeing information exchange protocol for use in conjunction with the protocol for providing the connectionless-mode network service (ISO 8473)," Second Edition, Nov. 15, 2002, ISO/IEC 2002, Switzerland (210 pages).

S. Deering and R. Hinden, "Internet Protocol, Version 6 (IPv6) Specification," RFC 8200, Jul. 2017, The Internet Society, Reston, VA, USA (forty-two pages).

Filsfls et al., "SRv6 Network Programming," draft-filsfils-spring-srv6-network-programming-05, Jul. 2, 2018, The Internet Society, Reston, VA, USA (fifty-three pages).

Filsfls et al., "SRv6 Network Programming," draft-filsfils-spring-srv6-network-programming-06, Oct. 22, 2018, The Internet Society, Reston, VA, USA (fifty-five pages).

Filsfls et al., "Segment Routing Architecture," RFC 8402, Jul. 2018, The Internet Society, Reston, VA, USA (thirty-two pages).

Previdi et al., "IPv6 Segment Routing Header (SRH)," draft-ietf-6man-segment-routing-header-14, Jun. 28, 2018, The Internet Society, Reston, VA, USA (twenty-nine pages).

Previdi et al., "IPv6 Segment Routing Header (SRH)," draft-ietf-6man-segment-routing-header-15, Oct. 22, 2018, The Internet Society, Reston, VA, USA (twenty-eight pages).

Filsfls et al., "Segment Routing Policy Architecture," draft-ietf-spring-segment-routing-policy-01, Jun. 11, 2018, The Internet Society, Reston, VA, USA (thirty-three pages).

Filsfls et al., "Segment Routing Policy Architecture," draft-ietf-spring-segment-routing-policy-02, Oct. 22, 2018, The Internet Society, Reston, VA, USA (thirty-three pages).

Bashandy et al., "Segment Routing with MPLS data plane" draft-ietf-spring-segment-routing-mpls-14, Jun. 11, 2018, The Internet Society, Reston, VA, USA (twenty-five pages).

Bashandy et al., "Segment Routing with MPLS data plane" draft-ietf-spring-segment-routing-mpls-15, Oct. 22, 2018, The Internet Society, Reston, VA, USA (thirty-five pages).

English Translation of Publication CN 107872388 A, generated by WIPO Patentscope on Nov. 16, 2021 (five pages).

Brzozowski et al., "Use Cases for IPv6 Source Packet Routing in Networking (Spring)," RFC 8354, Mar. 2018, The Internet Society, Reston, VA, USA (nine pages).

PCT International Search Report and Written Opinion, PCT Application PCT/US2019/057424, ISA/EP, European Patent Office, Netherlands, dated Dec. 10, 2019 (sixteen pages).

Dejan Jaksic, "Segment Routing in Service Provider networks," Cisco Connect, Rovinj, Croatia, Mar. 19-21, 2018, available at https://www.cisco.com/c/dam/m/hr_hr/training-events/2018/cisco-connect/pdf/Segment_Routing_in_Service_Provider_Network_-_Dejan_Jaksic.pdf, Cisco Systems, Inc., San Jose, CA, USA (eighty pages).

C. Filsfils et al., "Segment Routing Policy for Traffic Engineering," raft-filsfils-spring-segment-routing-policy-04, Dec. 22, 2017, The Internet Society, Reston, VA, USA (forty-one pages).

D. Dukes et al., "SR for SDWAN: VPN with Underlay SLA," draft-dukes-spring-sr-for-sdwan-00, Jun. 5, 2018, The Internet Society, Reston, VA, USA (nineteen pages).

P. L. Ventre et al., "Segment Routing: a Comprehensive Survey of Research Activities, Standardization Efforts, and Implementation Results," Jul. 11, 2019, (Submitted paper under review—v03—Jun. 2019), arxiv.org, Cornell University Library, Ithaca, NY (twenty-eight pages).

International Preliminary Report on Patentability for International Application No. PCT/US2019/057424, dated May 6, 2021, 10 Pages.

* cited by examiner

End.DT46M SID

A packet with End.DT46M SID is decapsulated, and based on next header protocol a label lookup, IPv4 lookup, or IPv6 lookup is performed in a corresponding table. The pseudo code for END.DT46M, of one embodiment, is as follows:

When N receives a packet destined to S, and
S is a local End.DT46M SID, N does:

IF NH=SRH and SL > 0
   drop the packet
ELSE
   pop the (outer) IPv6 header and its extension headers
   Based on Next header protocol of S,
      perform label lookup/IPv4 lookup/IPv6 lookup

FIGURE 5C

END.LSP SID

A packet with End.LSP SID is decapsulated and encapsulated with BGP LU received labels for PE loopback and transport labels to nexthop. End.LSP SID is allocated per LSP bounded to PE loopback. The Pseudo code for the new type of End.LSP SID is as follows:

570

```
When N receives a packet destined to S, and
S is a local End.LSP SID, N does:

IF NH=SRH and SL > 0
    drop the packet
ELSE
    pop the (outer) IPv6 header and its extension headers
    Encapsulate with label stack bound to the SID S
```

FIGURE 5F

PACKET NETWORK INTERWORKING INCLUDING SEGMENT ROUTING

CROSS-REFERENCE TO RELATED APPLICATIONS

This application is a continuation of U.S. patent application Ser. No. 16/659,484, filed Oct. 21, 2019, now U.S. Pat. No. 11,134,002, and claims benefit of U.S. Provisional Application No. 62/749,118, filed Oct. 22, 2018, both of these applications are hereby incorporated by reference in their entirety.

TECHNICAL FIELD

The present disclosure relates generally to packet switching network communications, including, but not limited to, data plane processing of packets in a packet network including multiple heterogeneous forwarding domains.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology in packet switching networks of various topologies.

BRIEF DESCRIPTION OF THE DRAWINGS

The appended claims set forth the features of one or more embodiments with particularity. The embodiment(s), together with its advantages, may be understood from the following detailed description taken in conjunction with the accompanying drawings of which:

FIG. 5C illustrates a process according to one embodiment;
FIG. 5F illustrates a process according to one embodiment.

DESCRIPTION OF EXAMPLE EMBODIMENTS

1. Overview

Figure 1A:
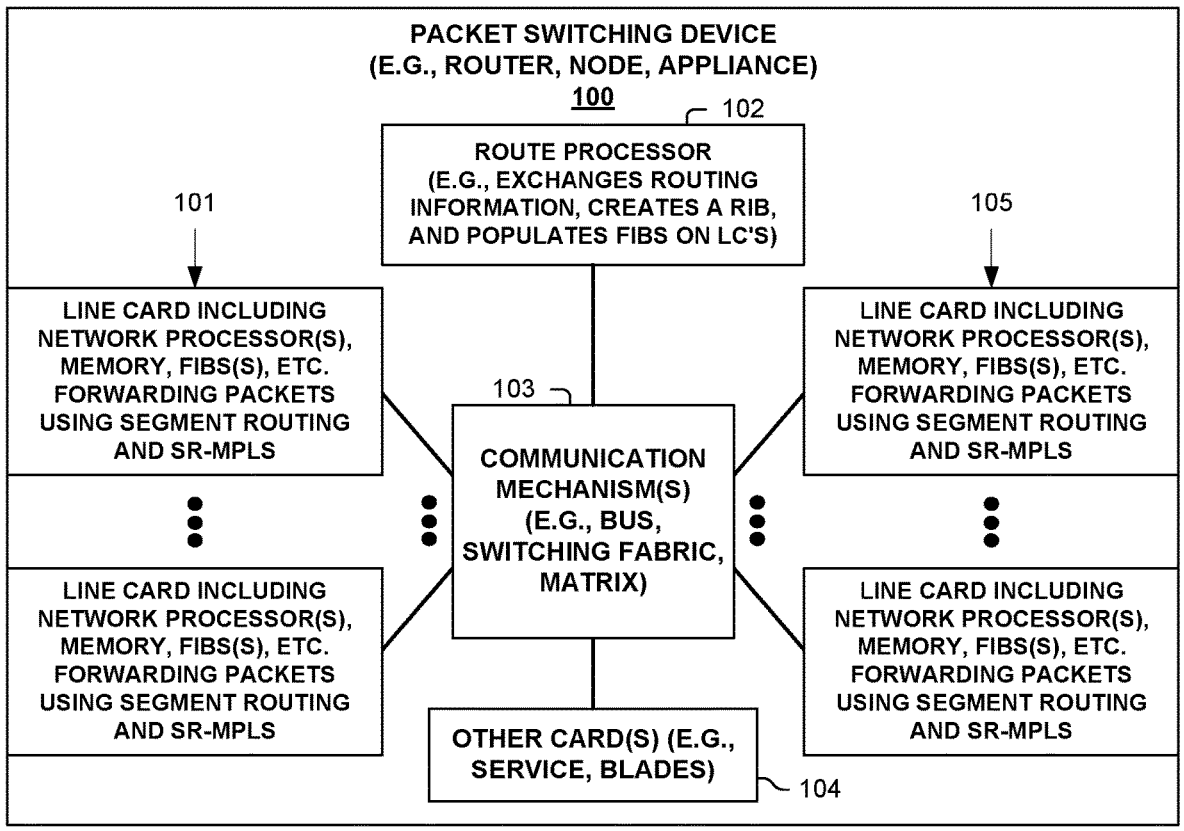
FIG. 1A illustrates a packet switching device according to one embodiment.

Disclosed are, inter alia, methods, apparatus, computer-storage media, mechanisms, and means associated with forwarding of packets through a network that includes interworking among different data plane protocol forwarding domains.

Aspects of the invention are set out in the independent claims and preferred features are set out in the dependent claims. Features of one aspect may be applied to each aspect alone or in combination with other aspects.

One embodiment includes a network comprising a first forwarding domain using a first data plane forwarding protocol and a second forwarding domain using a second data plane forwarding protocol different than the first data forwarding plane forwarding protocol. The first forwarding domain includes a first path node, a first intermediate node, and a particular border node. The second forwarding domain includes a second path node, a second intermediate node, and the particular border node.

One embodiment determines a particular path in the network from the first path node through the first intermediate node and the second intermediate node to the second path node without traversing the particular border node nor any gateway configured to convert packets sent over the particular path from the first data plane forwarding protocol to the second data plane protocol. Responsive to said determined particular path including the first intermediate node and the second intermediate node in different said forwarding domains using different said data plane forwarding protocols, the particular path is modified; and packets, after applying a first forwarding policy at the first path node, are sent over said modified particular path. In one embodiment, each of said first and second data plane forwarding protocols is a different one from the group consisting of the two elements of Internet Protocol version 6 (IPv6) Segment Routing (SRv6) and Segment Routing Multiprotocol Label Switching (SR-MPLS).

In one embodiment, said modifying the particular path includes installing a particular Binding Segment Identifier (BSID), according to the first data plane forwarding protocol, on the particular border node defining a second traffic engineered path, according to the second data plane forwarding protocol, from the particular border node through the second intermediate node to the second path node.

In one embodiment, said modifying the particular path includes installing the first forwarding policy, according to the first data plane forwarding protocol, defining a first traffic engineered path from the first path node, through the first intermediate node, to the particular border node; wherein the first traffic engineered path includes the particular BSID.

In one embodiment, the network comprises a third forwarding domain using the first data plane forwarding protocol; wherein the third forwarding domain includes a third path node; wherein said modified particular path further traverses the network from the second path node to the third path node; and wherein the first traffic engineered path further traverses the network from the second path node to the third path node, and the first traffic engineered path includes an ordered plurality of SIDs that includes a SID of the first intermediate node, the particular BSID, and a SID of the third path node. In one embodiment, the third forwarding domain includes a third intermediate node on said modified particular path between the second path node and the third path node; and wherein the ordered plurality of SIDs includes a SID of the third intermediate node between the particular BSID and said SID of the third path node.

In one embodiment, the particular border node receives a route advertisement associating the second path node with a second path node Binding Segment Identifier (BSID) installed on the second path node. The particular border node advertises to the first path node, a BGP Labeled Unicast (BGP-LU) route advertisement associating the second path node with a next hop of the particular border node and with a particular border node BSID installed on the particular border node. In response to receiving an Segment Routing Multiprotocol Label Switching (SR-MPLS) packet including the particular border node BSID at the top of a label stack of the SR-MPLS packet, the particular border node removing the particular BSID, encapsulating the resultant packet in an Internet Protocol version 6 (IPv6) packet with a Destination Address of the second path node BSID, and sending the packet into the second forwarding domain of the network.

In one embodiment, the particular border node receives from the second path node a BGP Labeled Unicast (BGP-LU) route advertisement associating the second path node with a particular label. The particular border node advertises, a route advertisement associating the second path node with a particular border node BSID installed on the particular border node. In response to receiving an Internet Protocol version 6 (IPv6) packet with a Destination Address of the particular border node BSID, the particular border node generating a particular Segment Routing Multiprotocol Label Switching (SR-MPLS) packet with a label stack including one or more transport or said received BGP-LU advertise particular label, and sending the particular SR-MPLS into the second forwarding domain of the network.

2. Example Embodiments

Disclosed are, inter alia, methods, apparatus, computer-storage media, mechanisms, and means associated with forwarding of packets through a network that includes interworking among two or more different data plane protocol forwarding domains. One embodiment provides interworking between transit domains forwarding packets according to Segment Routing (e.g., Internet Protocol version 6 (IPv6) Segment Routing (SRv6) or SRv4, or according to Segment Routing Multiprotocol Label Switching (SR-MPLS)). As used herein, the terms "MPLS" and "SR-MPLS" are interchangeably used herein to refer to original MPLS and/or MPLS Segment Routing (SR-MPLS). The context of their usage may provide a distinguishing feature, such as, a label being a segment identifier (SID). Various formats of a Segment Identifier (SID) include a segment descriptor (e.g., IPv6 or IPv4 address) or MPLS label.

As used herein, a Segment Routing IP packet (e.g., SRv6 or SRv4 packet) may or may not have a Segment Routing Header (SRH). For example, a Segment Routing packet having a single segment (e.g., an IPv6 address) has its IP Destination Address with a value of this single segment, and with or without a SRH including this segment.

Embodiments described herein include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable media containing instructions. One or multiple systems, devices, components, etc., may comprise one or more embodiments, which may include some elements or limitations of a claim being performed by the same or different systems, devices, components, etc. A processor refers to a general processor, task-specific processor, a core of one or more processors, or other co-located, resource-sharing implementation for performing the corresponding processing. The embodiments described hereinafter embody various aspects and configurations, with the figures illustrating exemplary and non-limiting configurations. Computer-readable media and means for performing methods and processing block operations (e.g., a processor and memory or other apparatus configured to perform such operations) are disclosed and are in keeping with the extensible scope of the embodiments. The term "apparatus" is used consistently herein with its common definition of an appliance or device. The "router" (one type of packet switching device) is often used herein in describing one embodiment, with the teachings applicable to other types of packet switching devices (e.g., switches). The term "route" is used to refer to a fully or partially expanded prefix (e.g., 10.0.0.1 or 10.0.*.*), which is different than a "path" through the network which refers to a nexthop (e.g., next router) or complete path (e.g., traverse router A then router B, and so on). Also, the use of the term "prefix" without a qualifier herein refers to a fully or partially expanded prefix.

The steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc., as well as "particular" and "specific" are typically used herein to denote different units (e.g., a first widget or operation, a second widget or operation, a particular widget or operation, a specific widget or operation). The use of these terms herein does not necessarily connote an ordering such as one unit, operation or event occurring or coming before another or another characterization, but rather provides a mechanism to distinguish between elements units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC § 101 machine statutory class.

Figure 1B:
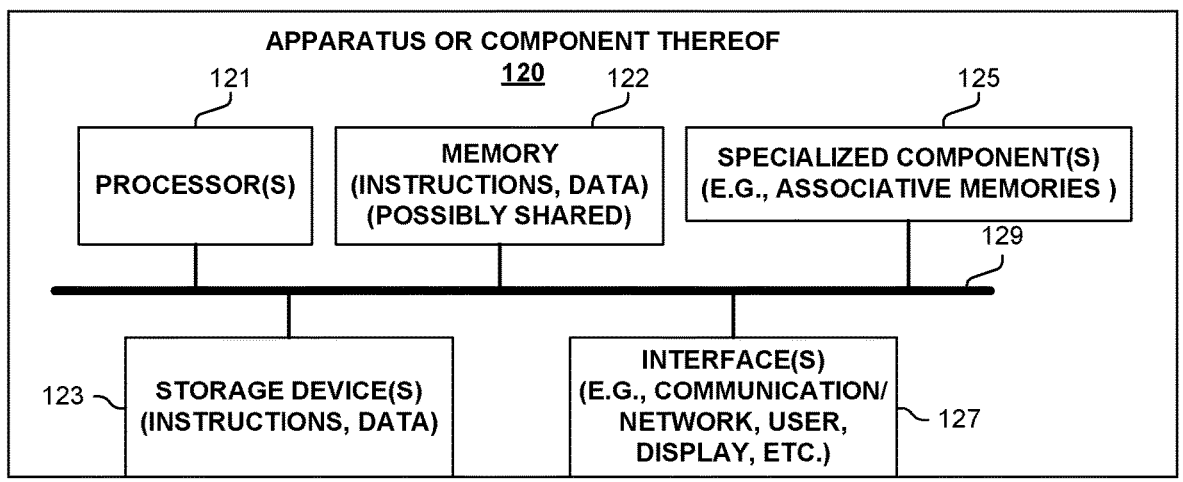
FIG. 1B illustrates an apparatus or component thereof according to one embodiment.

FIGS. 1A-B and their discussion herein are intended to provide a description of various exemplary systems used in one embodiment.

One embodiment of a packet switching device 100, associated with forwarding of packets through a network that includes interworking among different data plane protocol forwarding domains, is illustrated in FIG. 1A. Packet switching device 100 includes multiple line cards 101 and 105, each with one or more network interfaces for sending and receiving packets over single or aggregated communications links (e.g., electrical, optical, radio) and with one or more processors used in performing control plane (e.g., maintaining forwarding data structures) and data plane operations (e.g., processing of packets such as, but not limited to forwarding/sending, dropping, manipulating, changing, modifying, receiving, creating, duplicating, encapsulating/decapsulating, applying service(s), operations-related processing). Packet switching device 100 includes a route processor 102 comprising one or more processors used in implementing a control plane of packet switching device 100. In one embodiment, packet switching device 100 includes other card(s) 104 (e.g., service cards and/or blades) used in performing control plane and/or data plane operations of packet switching device 100, implementing a service, and/or performing other functionality. Packet switching device 100 includes one or more hardware-based communication mechanisms 103 (e.g., bus, switching fabric, matrix, etc.) providing communication among its different entities 101, 102, 104 and 105. Line cards 101 and 105 typically perform the actions of being both an ingress and egress line card.

FIG. 1B is a block diagram of an apparatus 120, associated with forwarding of packets through a network that includes interworking among different data plane protocol forwarding domains, and used in one embodiment. In one embodiment, apparatus 120 performs one or more processes, or portions thereof, as illustrated and/or otherwise described herein. In one embodiment, apparatus 120 includes one or more processor(s) 121 (typically with on-chip memory), memory 122, storage device(s) 123, specialized component(s) 125 (e.g. optimized hardware such as for performing lookup and/or packet processing operations, associative memory, binary and/or ternary content-addressable memory, etc.), and interface(s) 127 for communicating information (e.g., sending and receiving packets, user-interfaces, displaying information, etc.), which are typically communicatively coupled via one or more communications mechanisms 129 (e.g., bus, links, switching fabric, matrix), with the communications paths typically tailored to meet the needs of a particular application.

Various embodiments of apparatus 120 may include more or fewer elements. The operation of apparatus 120 is typically controlled by processor(s) 121 using memory 122 and storage device(s) 123 to perform one or more tasks or processes. Memory 122 is one type of computer-readable/computer-storage medium, and typically comprises random access memory (RAM), read only memory (ROM), flash memory, integrated circuits, and/or other memory components. Memory 122 typically stores computer-executable instructions to be executed by processor(s) 121 and/or data which is manipulated by processor(s) 121 for implementing functionality in accordance with an embodiment. Storage device(s) 123 are another type of computer-readable medium, and typically comprise solid state storage media, disk drives, diskettes, networked services, tape drives, and other storage devices. Storage device(s) 123 typically store computer-executable instructions to be executed by processor(s) 121 and/or data which is manipulated by processor(s) 121 for implementing functionality in accordance with an embodiment.

Figure 1C:
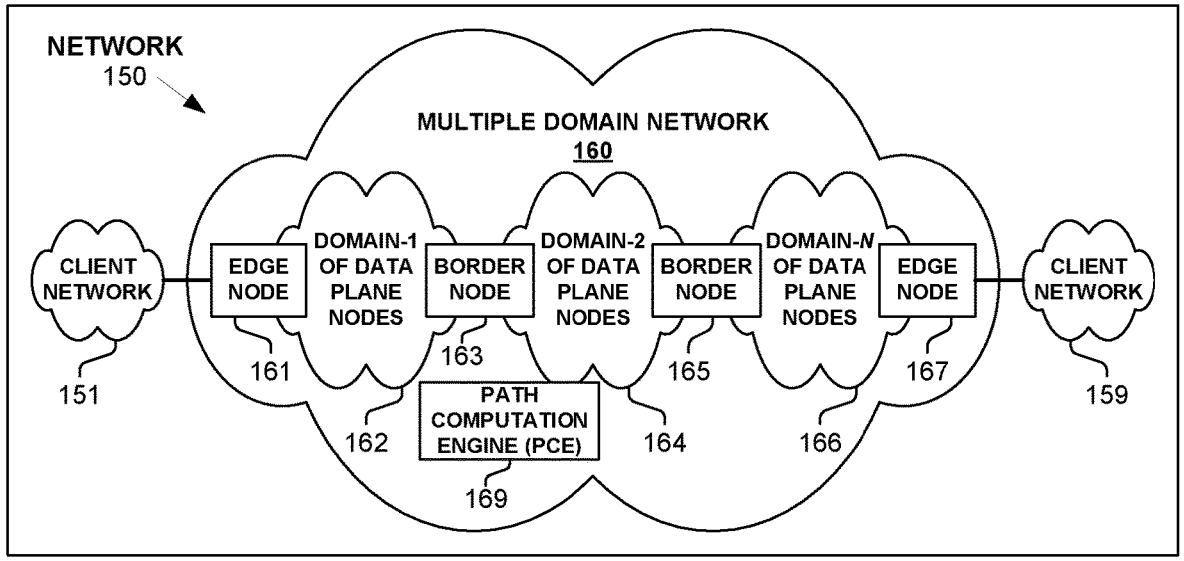
FIG. 1C illustrates a network operating according to one embodiment.

FIG. 1C illustrates a network 150 (e.g., an aggregation of one or more networks of one or more different entities) operating according to one embodiment. As shown, network 150 includes client networks 151 and 159 (which are the same network in one embodiment) communicatively coupled via edge nodes 161 and 167 of network 160 that includes multiple, N domains (162, 164, 166) of network nodes, with N being a non-zero integer, interconnected via border node(s) (163, 165). Each of client networks 151 and 159 typically include hosts (e.g., end nodes) with upper-layer applications that communicate via network 150. In one embodiment, some of the hosts in client network 151 and/or 159 are Segment Routing-capable in that they can generate and process Segment Routing (SR) packets.

In one embodiment, edge nodes 161 and 167 process packets received from networks 151 and 159, which may include encapsulating or otherwise processing these packets into SR (or SR-MPLS) packets such as by adding a SR header (and possibly another IP header) to these packets according to a data plane ascertained Segment Routing policy, and subsequently decapsulating or removing a Segment Routing header (and possibly another IP header) and forwarding the native (Segment Routing or IP) packets into network 151 and 159.

Figure 1D:
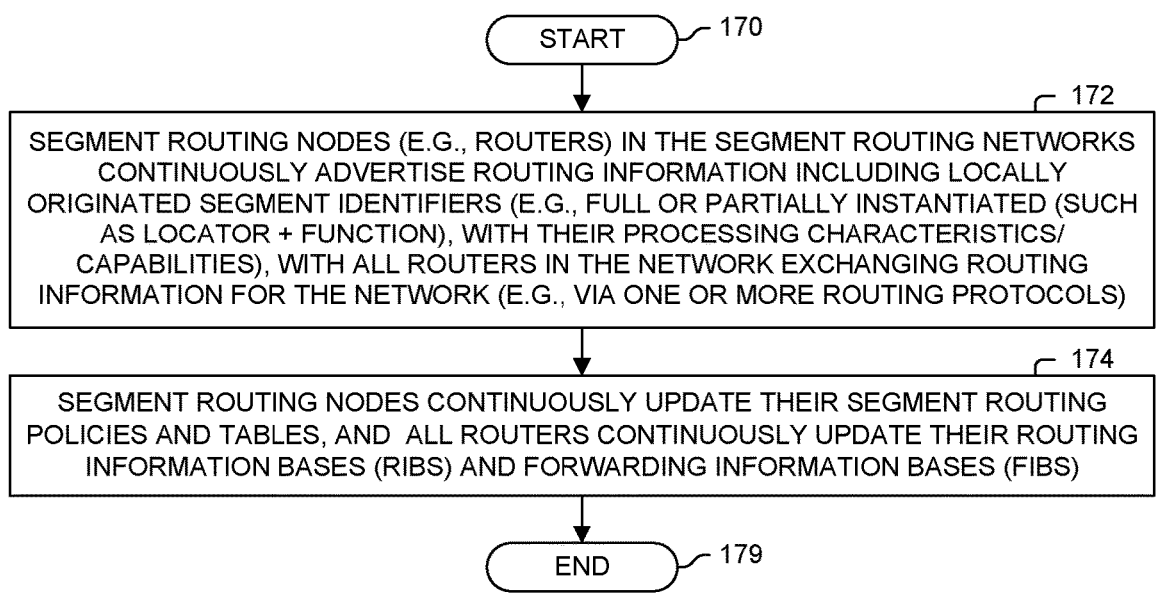
FIG. 1D illustrates a process according to one embodiment.

In one embodiment, a Segment Routing edge node (161, 167), another node within network 160, or a path computation engine (PCE) 169 determines Segment Routing policies (e.g., list of SL Groups that include Segment Identifiers) to apply to packets of different packet flows. These policies can change in response to network conditions, network programming, etc. In one embodiment, the Segment Routing policy specifies to add one or more SR headers, each with one or more SL Groups, resulting in a Segment Routing packet having one or more Segment Routing headers. In one embodiment, a native packet is received without a Segment Routing header (possibly with an IP Destination Address that is a Segment Identifier/IP address of the receiving Segment Routing node), and the Segment Routing node encapsulates the native packet in a Segment Routing packet including one or more added Segment Routing headers, each including one or more SL Groups. In one embodiment, a Segment Routing packet is received with a Segment Routing header, and with Segment Routing node adding one or more Segment Routing headers resulting in a Segment Routing packet including one or more added Segment Routing headers, each including one or more SL Groups. In contrast, and for each of these scenarios, a single Segment Routing header could have been used that includes all of the SL Groups. In one embodiment, an SR-MPLS packet encapsulates a received packet, with a label stack of the SR-MPLS packet including one or more segment identifiers in the form of label(s).f FIG. 1D illustrates a process according to one embodiment. Processing begins with process block 170. In process block 172, routers in the networks continuously advertise and exchange routing information including Segment Routing information (e.g., routes including Segment Identifiers of network nodes and their corresponding function or function/arguments, attributes of Segment Identifiers, attributes of node) and other routing information (e.g., IPv4 or IPv6 topology information) typically via one or more routing protocols and/or other protocols. In one embodiment, these advertised SIDs include SR-MPLS labels and IPv6 addresses. In one embodiment, each domain is instantiated by a single Interior Gateway Protocol (IGP) instance or a network within IGP if there is clear separation of the data plane. In process block 174, Segment Routing and other network nodes continuously update their Segment Routing policies and routing/forwarding information as required (e.g., based on information received via a routing or other protocol, from a network management system, from a path computation engine, etc.). Processing of the flow diagram of FIG. 1D is complete as indicated by process block 179.

Referring again to FIG. 1C, in one embodiment, multiple domain network 160 (e.g., a provider network) includes Segment Routing-capable routers and non-Segment Routing-capable routers (e.g., they do not process a Segment Routing header/complete Segment Identifier). In one embodiment, multiple domain network 160 (e.g., a provider network) includes Segment Routing Multiprotocol Label Switching (SR-MPLS)-capable routers and non-MPLS capable routers. In one embodiment, multiple domain network 160 includes routers that forward packets according to one or more other protocols. One embodiment provides co-existence in network 160 as it supports both Internet Protocol Version 6 Segment Routing (SRv6) and SR-MPLS in a given domain (162, 164, 166).

In one embodiment, domains (162, 164, 166) are heterogeneous in that they do not forward packets using a same packet forwarding protocol (e.g., SRv6, SR-MPLS). Moreover, a path through network 160 may traverse multiple, heterogeneous series of domains (162, 164, 166) which requires a transformation or "stitching" at border nodes (163, 165) between packet forwarding protocols.

For example, the incremental deployment of SRv6 into existing networks requires SRv6 networks to interwork and co-exist MPLS networks. One embodiment performs according to one or more SRv6 and SR-MPLS/MPLS interworking scenarios, including from the following four categories:
  SRv6 over MPLS ("6oM");
  MPLS over SRv6 ("Mo6");
  SRv6 to MPLS ("6toM"); and
  MPLS to SRv6 ("Mto6").
These embodiments cover various cascading of SRv6 and MPLS domains (162, 164, 166) in network 160.

In describing one embodiment, network interworking is often described herein as a stitching of SRv6 domain and SR-MPLS/MPLS domain. Special stitching procedures are performed on routers which acts as border between such domains. Border routers typically support both SRv6 and SR-MPLS/MPLS. One embodiment provides network interworking when SRv6 domains are being deployed into existing SR-MPLS/MPLS backbones or access networks. One embodiment applies to homogeneous deployment scenarios (e.g., SRv6 over SR-MPLS/MLPS and SR-MPLS/MLPS over SRv6). One embodiment applies to heterogeneous deployment scenarios (e.g., SRv6 to SR-MPLS/MLPS and SR-MPLS/MLPS to SRv6), as well as any mix of the cascaded SRv6 and SR-MPLS/MPLS islands.

One embodiment stiches heterogeneous and/or homogeneous domains end-to-end using a controller-based solution, e.g., using a Path Computation Engine (PCE); while one embodiment stiches heterogeneous and/or homogeneous domains using a Border Gateway Protocol (BGP) signaling-based approach. One embodiment of the PCE based solution provides both best effort as well as deployments where tight Service Layer Agreement (SLA) guarantees are required (e.g., On-Demand Next Hop (ODN) like deployments scenarios). One embodiment of the BGP signaling covers the best effort case.

One embodiment performs stitching using a Controller. An SDN based approach like Multi-Domain On Demand Nexthop (ODN) case for SLA contract end-to-end across heterogeneous domains. In one embodiment, a Path Computation Element (PCE) performs operations of a controller. In one embodiment, these procedures are typically used when overlay prefixes have SLA requirement signaled through a color community. These procedures can also be used for the best effort services.

Stitching using BGP Inter-Domain Routing. In one embodiment, Border Gateway Protocol procedures (e.g., described in RFC 3107) are used to advertise provider edge locators/Loopback addresses for best effort end-to-end connectivity. These procedures are typically used in deployments where an SDN controller is not deployed. These procedures are also used in one embodiment when overlay prefixes do not have SLA requirement(s).

In summary, one embodiment provides SRv6/MPLS interworking using one or more of the following interworking scenarios:
  Carrying SRv6 over SR-MPLS (controller stitches domains).
  Carrying SRv6 over SR-MPLS (BGP stitches domains).
  Carrying SR-MPLS over SRv6 (controller stitches domains).
  Carrying SR-MPLS over SRv6 (BGP stitches domains).

SRv6 to SR-MPLS translation (controller stitches domains).
SRv6 to SR-MPLS translation (BGP stitches domains).
SR-MPLS to SRv6 translation (controller stitches domains).
SR-MPLS to SRv6 translation (BGP stitches domains).
Cascaded domains (controller stitches domains).
Cascaded domains (BGP stitches domains).

Figure 2A:
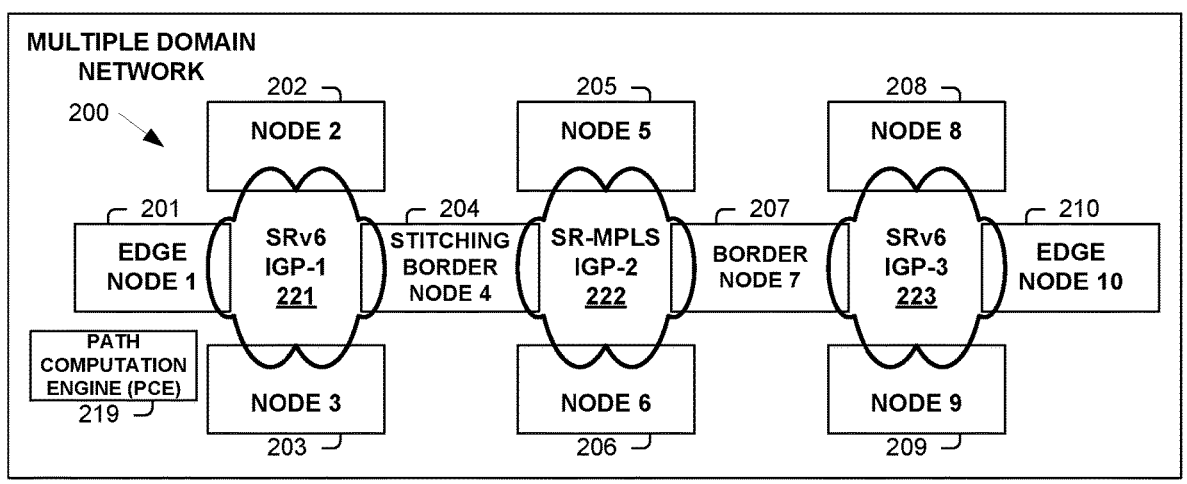
FIG. 2A illustrates a network operating according to one embodiment.

FIG. 2A illustrates a multiple domain network 200 according to one embodiment. Network 200 includes three domain networks (221, 222, 223), with domain networks 221 and 223 forwarding packets (e.g., data plane processing) using SRv6 and with domain network 222 forwarding packets using SR-MPLS. However, the teachings discussed in relation to FIG. 2A are also directly applicable to numerous other data plane forwarding scenarios and architectures. Domain network 221 includes nodes 201, 202, 203, and 204. Domain network 222 includes nodes 204, 205, 206, and 207. Domain network 223 includes nodes 207, 208, 209, and 210. In one embodiment, network 200 includes one or more BGP route reflectors (RRs).

One embodiment provides a best-effort path as well as a path that satisfies the Service Level Agreement (SLA), across multiple domains (221, 222, 223). In one embodiment, Path Computation Element (PCE) 219 is also an SDN controller. In one embodiment, PCE (controller) 219 computes and programs end-to-end path based on the SLA In one embodiment, PCE 219 learns of the interworking requirement at border nodes (204, 207), as each domain typically feeds topological information to PCE 219 through BGP Link-State (BGP LS) feeds. In performing the interworking, one embodiment represents an intermediate domain of a different data plane type as a Binding SID (BSID) of headend type (e.g., SRv6 in network 221) in the SID list of a packet transmitted from node 201 to stitching/border node 204. The intermediate domain BSID is programmed at domain entry border node(s) (204), with Segment Routing Policy added to packets having a stack of labels/SID(s) to traverse domain 222 to node (207) identified by a SID/label, which is typically the last label (or second from the bottom label followed by a VPN label) in a label stack of the MPLS packet. Thus, in one embodiment, a path to transit an intermediate heterogeneous domain (222) is replaced by a BSID of the data plane nature of a headend (e.g., a SRv6 BSID as network 221 is operating according to SRv6), and is typically available to all interworking deployments.

When a service prefix (e.g., that of a Virtual Private Network (VPN) or Ethernet VPN (EVPN) service) is received on edge node 201 with an SLA (e.g., color extended community), edge node 201 requests from PCE 219 a path to egress node 210 that can satisfy the SLA. SR-aware PCE 219 computes a corresponding traffic engineered path through the multiple domain network 200 to edge node 210. In one embodiment, edge node 201 provides to PCE 219 one or more optimization objective(s), constraint(s), requirement(s) etc., such as, but not limited to a [maximum] latency, [minimum] bandwidth, [maximum] jitter, and/or other operational criteria. In response to such request and in one embodiment, PCE 219 computes a correspond path that traverses nodes 201, 202, 205, 208, and 210.

In one embodiment, in determining the path, PCE 219 identifies that the end-to-end path is not consistent in the data planes (e.g., requires internetworking) and invokes interworking procedure(s) at border node 204 to perform stitching. PCE 219 programs a stitching policy at border node 204 that will "stitches" domains 221 and 222 using the Segment Routing function of MPLS Binding Segment (End.BM) identified by a corresponding Binding Segment Identifier (BSID) in a packet that traversed domain 221. In one embodiment, PCE 219 provisions the corresponding BSID for border node 204 and causes it to be installed in border node 204 to invoke the desired behavior of transporting the packet through network 222 according to a determined path. The corresponding Segment Routing Policy to be applied to packets includes labels/SIDs corresponding to the traversal order through node 205 to node 207. PCE 219 responds to node 201 with the ordered list of SIDs corresponding to nodes 202, 204, 205, 207, 208, and 210.

The following terminology is used herein.

A Segment Identifier (SID) represents a specific segment in a Segment Routing domain (or a label in a SR-MPLS domain).

Node k has a classic IPv6 loopback address Ak::/128.

A SID at node k with locator block B and function F is represented by B:k:F::

A SID list is represented as <S1, S2, S3>, where the traversal order of the SR path is S1, S2 then S3.

(SA,DA) (S3, S2, S1; SL) represents an IPv6 packet with:
  IPv6 header with source address SA, destination addresses DA, and next-header Segment Routing Header (SRH) as the; and
  a SRH with Segment List of <S1, S2, S3> with Segments Left=SL.

Note the difference in semantics between < > and ( ) symbols denoting an ordered list of SIDs. <S1,S2,S3> represents a SID List with a traversal order of S1, S2, then S3. (S3,S2, S1;SL) represents the same SID List but encoded in the SRH format where the rightmost SID in the SRH is the first SID and the leftmost SID in the SRH is the last SID, and has a Segments Left (SL) value. When referring to an SR policy in a high-level use-case, the <S1,S2,S3> notation is typically used. When referring to detailed packet behavior, the (S3, S2,S1;SL) notation is typically used. Segments for a SR-MPLS/MPLS packet are listed in the same order (as a label stack is added to a packet in order, not reversed as in a Segment List of a SRH).

Figure 2B:
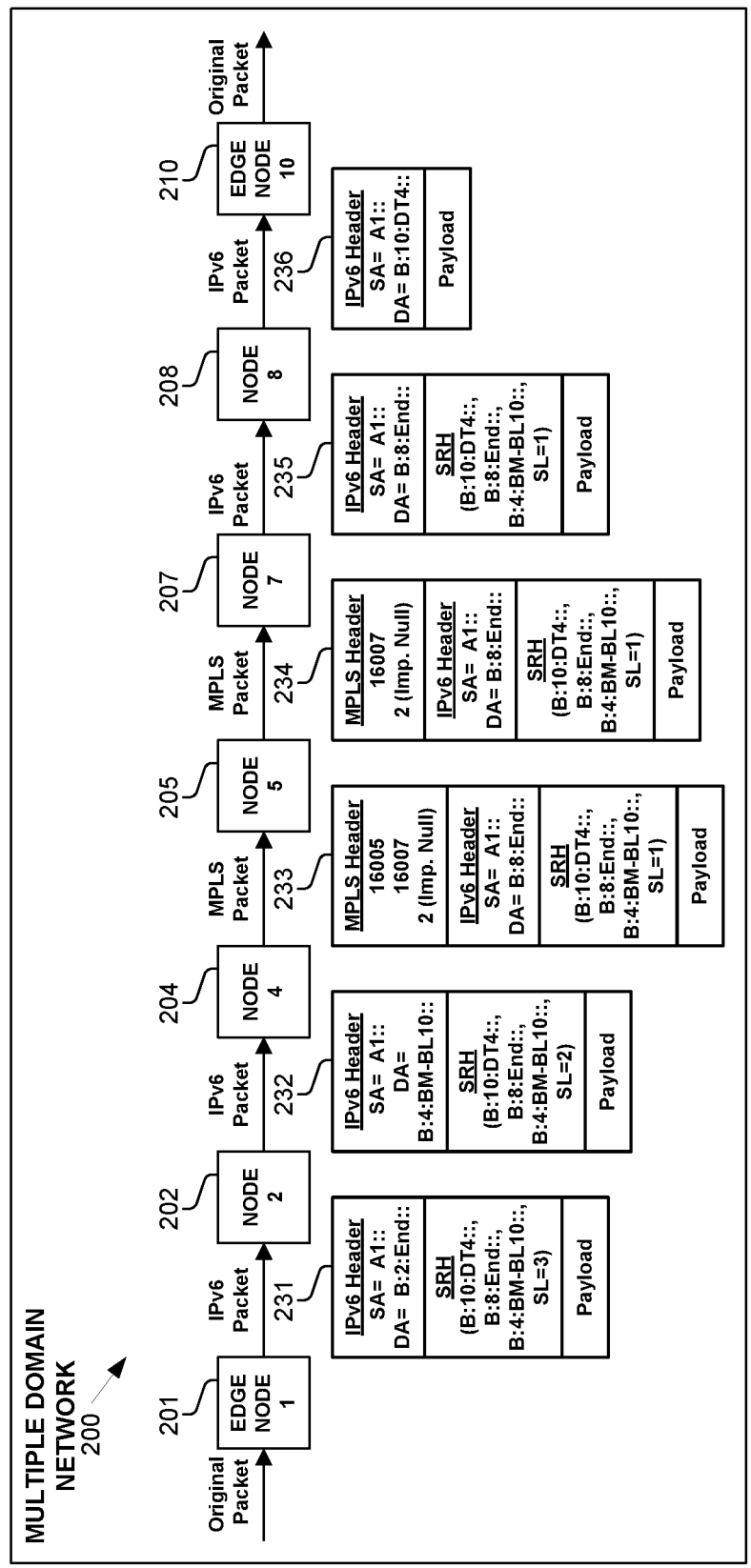
FIG. 2B illustrates a network operating according to one embodiment.

In one embodiment, corresponding data plane processing interworking operations are illustrated in FIG. 2B (with nodes shown from FIG. 2A). Edge node 201 operates according to SRv6 function T.Encaps.Red (or T.Encaps) (to encapsulate the original packet in the Payload) with a VPN service SID and SRv6 Policy (BLUE,10), resulting in IPv6 (and SRv6) packet 231 being sent. Node 202 receives IPv6 packet 231 and performs the End function, resulting in IPv6 packet 232 being sent. Node 204 receives IPv6 packet 232 and performs the End.BM function, resulting in MPLS packet 233 being sent. Node 205 receives MPLS packet 233, and performs MPLS forwarding processing resulting in MPLS packet 234 being sent. Node 207 receives and processes MPLS packet 234, resulting in IPv6 Packet 235 (due to Penultimate hop popping (PHP) behavior for Label 16007) being sent. Node 208 receives IPv6 Packet 235 and performs the End(PSP) SR function, resulting in IPv6 packet 236 being sent. Node 210 receives IPv6 packet 236 and performs the SR End.DT function that decapsulates the original IP packet. Node 210 performs an egress forwarding lookup operation on the IP Destination Address of the original IP packet in the corresponding Virtual Routing and Forwarding (VRF) table, and accordingly sends the original packet to the customer edge device.

One embodiment stitches heterogeneous domains using BGP interdomain routing. For providing services across domains (221, 222, 223 of FIG. 2A), edge node locators (e.g., IPv6 addresses of nodes 201 and 210) need to be reachable. One embodiment operates as follows.

> Locators are advertised by edge nodes in the BGP IPv6 unicast address family(AFI=2,Safi=1) to border nodes. These locators are also advertised in its local IGP domain.
>
> On border nodes these prefixes are like any IPv6 global prefixes. These are advertised in BGP IPv6 LU[AFI=2/SAFI=4] session using RFC 3107 procedures in label core. In one embodiment, it is a summary prefix for all locators in that domain.
>
> Remote domain border router advertising locator over SRv6 domain need to attach SRv6 SID in prefix SID attribute. SRv6 SID in this case is an End function of advertising border node.
>
> Ingress node learns remote locators over BGP IPv6 address family[AFI=2, SAFI=1]. These locators have prefix SID attribute containing SRv6 SID. This SRv6 SID is End function of advertising border node and helps to tunnel traffic to border node in remote domain.
>
> If locators are summarized, then in one embodiment they are leaked in remote IGP which then typically alleviates the need for tunneling of traffic in remote domain. Hence, attaching an SRv6 SID on the remote border nodes can be avoided.

This processing according to one embodiment is applicable to any of the deployment models described herein. When operating for Mob, 6toM, Mto6, processing in one embodiment includes one or more of the following.

> Loopback address are advertised in BGP label unicast session to border node when advertised from MPLS domain. These are also advertised in local IGP.
>
> Border nodes advertises prefix over SRv6 domain in BGP IPv4/IPv6 session. It attaches prefix SID attribute with SRv6 SID. This SRv6 SID maps to label received in prefix update.
>
> Remote border node allocates local label to advertise prefix in MPLS domain to ingress node. This local label maps to received SRv6 SID in prefix SID attribute of prefix.

In one embodiment, SRv6-based VPN (SRv6-VPN)/EVPN service information is encoded in SRv6 SIDs, including for SRv6 functions END.DT*/END.DX*/END.DT2. MPLS-based VPN service information is encoded in labels.

One embodiment uses a software-defined networking approach in transporting SRv6 packets over an SR-MPLS domain 222 in multiple domain network 200 shown in FIG. 2A. One embodiment provides a best-effort path as well as a path that satisfies the Service Level Agreement (SLA), across multiple domains (221, 222, 223). In one embodiment, a Path Computation Element (PCE) is also an SDN controller. In that case, based on the SLA, the PCE (controller) typically computes and programs end-to-end path based on the SLA. The SDN controller/PCE is also aware of interworking requirement at border nodes (204, 207) as each domain feeds topological information to the controller through BGP Link State (LS) feeds.

Figure 3A:
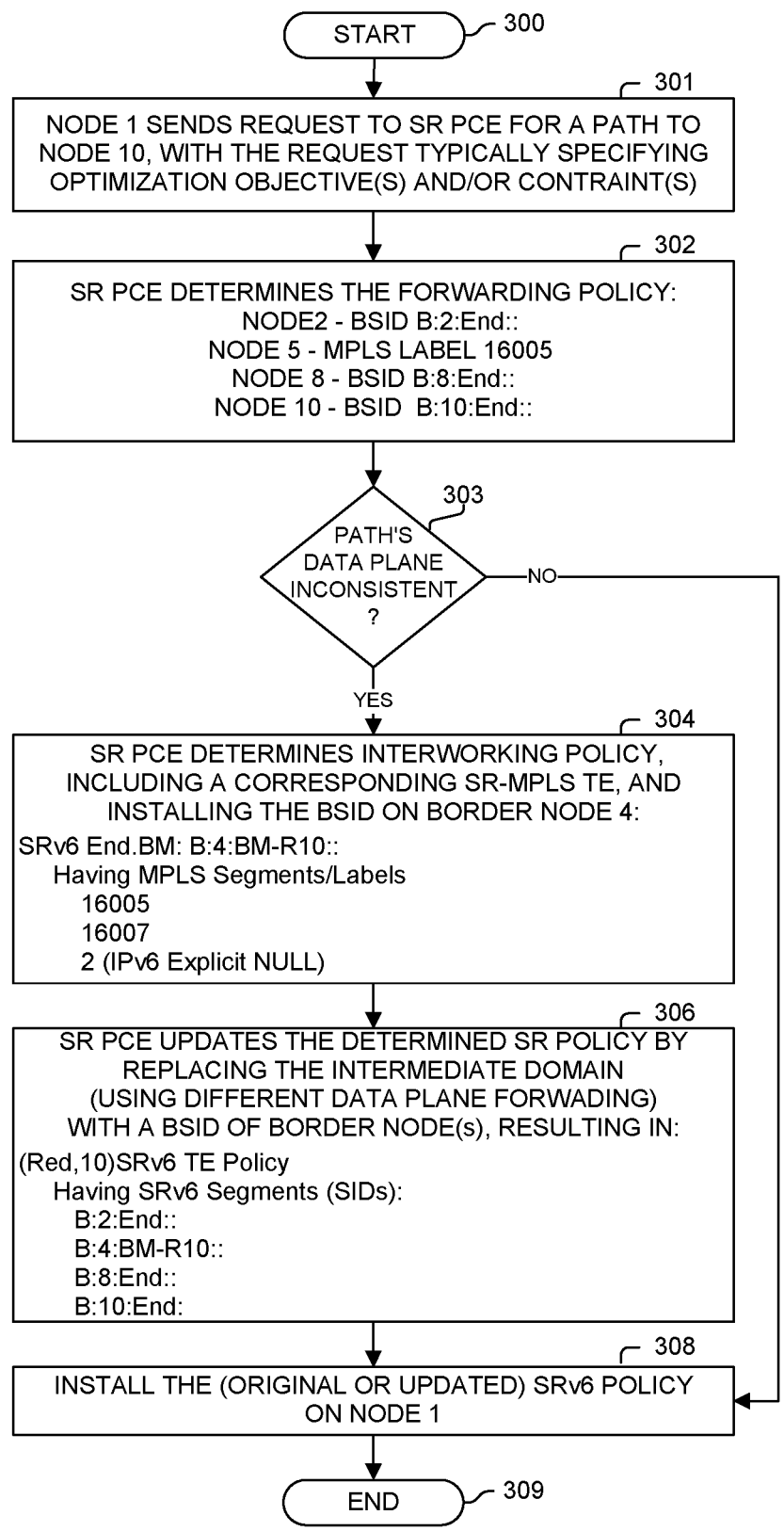
FIG. 3A illustrates a process according to one embodiment.

FIG. 3A illustrates a process performed in one embodiment that traverses an intermediate domain of a heterogeneous data plane network using a BSID at the border node to modify the packet to traverse the intermediate domain's data plane (e.g., to another border node).

Processes begins with process block 300. In process block 301, node 1 sends a request to the SR PCE for a path through network 200 (FIG. 2A) to node 10, typically with the request including one or more objectives and/or constraints (e.g., in order to conform to the requirements of an SLA). In one embodiment, the request is generated in response to a service prefix (e.g., VPN or EVPN) being received on edge node 1 with a corresponding SLA (e.g., color extended community).

In process block 302, the SR PCE computes a path/SR policy from node 1 traversing nodes 2, 5, 8, and 10, with corresponding SIDs: <B:2:End::, Label 16005, B:5:End::, B:8:End::, and B:10:End::>.

As determined in process block 303, if there is an inconsistent data plane throughout the path (e.g., SR-MPLS domain network 222 interconnecting SRv6 domain networks 221 and 223), then processing proceeds to process block 304; otherwise, processing proceeds directly to process block 308.

In process block 304, SR PCE determines the interworking policy, including a corresponding SR-MPLS Traffic Engineering (TE) having segments/labels <16005, 16007, 2 (IPv6 Explicit NULL)>; and the BSID End.BM:B: B4:BM-R10:: that will cause a packet to be sent over this SR-MPLS TE is installed on border node 4. In process block 306, the SR policy determined in process block 302 is updated by replacing SIDs within the domain(s) with different data plane processing with BSID(s) of border node(s). In network 200, only one such SID needs replacing with the BSID of border node 4 (installed in process block 304), resulting in the updated path/SR Policy from node 1 traversing nodes 2, 4, 5, 7, 8, and 10, with corresponding SIDs: <B:2:End::, B:4:BM-R10::, B:8:End::, B:10:End::>. Processing proceeds to process block 308.

In process block 308, the original or updated SRv6 policy is installed on node 1.

Processing of the flow diagram of FIG. 3A is complete as indicated by process block 309.

In one embodiment, a second "stitching" or interworking policy is installed on border node 7 that will add the Segment Routing policy to traverse node 8 to reach node 10. In such case, the Segment List of the policy installed at edge node 1 contains fewer SIDs, thus making the SRH smaller which may provide packet processing advantages despite the extra packet processing cost at node 7.

Figure 3B:
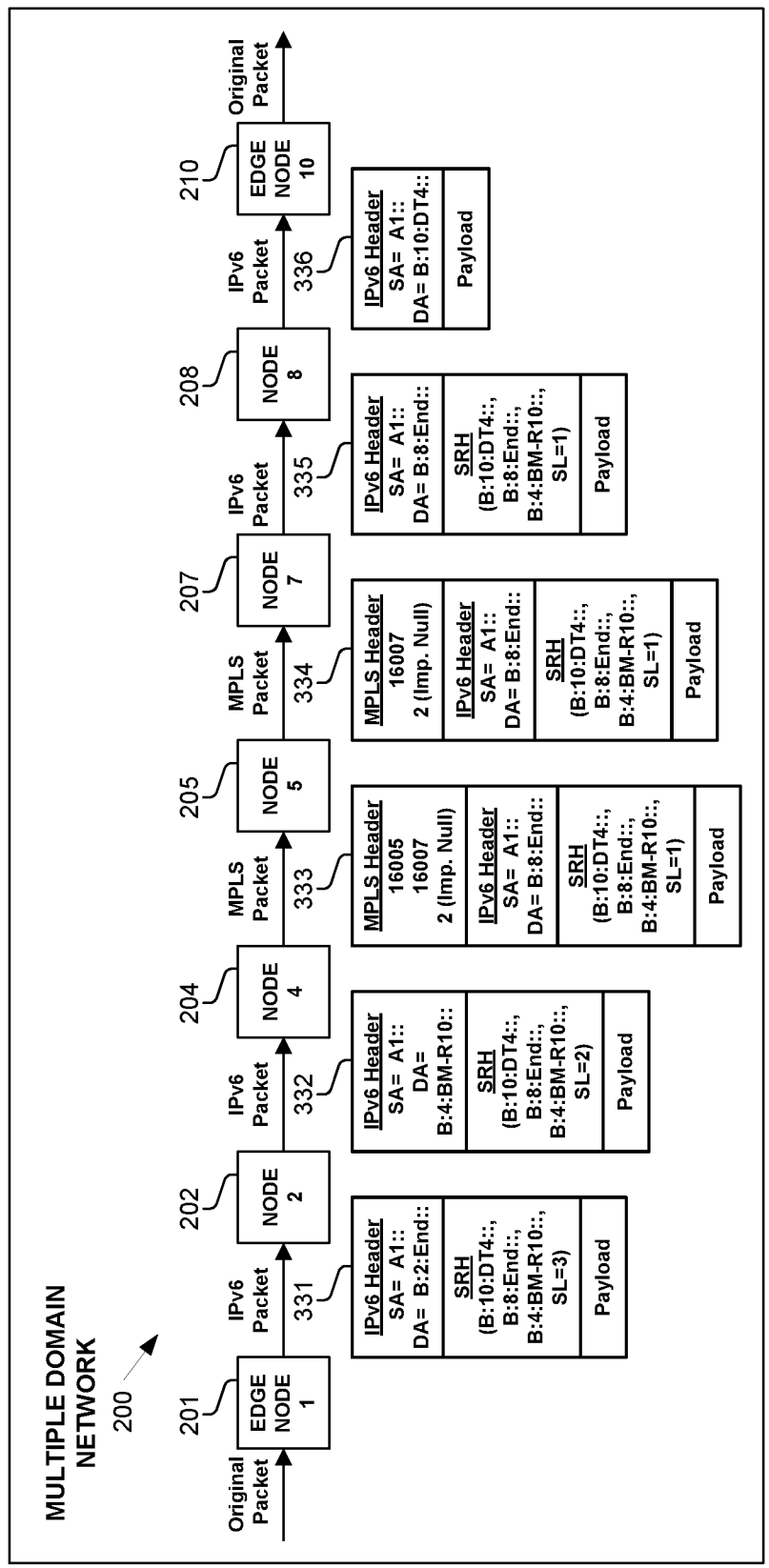
FIG. 3B illustrates a network operating according to one embodiment.

FIG. 3B illustrates data plane processing interworking operations of network 200 (FIG. 2A) corresponding to the control plane configuration performed in FIG. 3A. Edge node 201 operates according to SRv6 function T.Encaps.Red (or T.Encaps) (encapsulating the original packet in the Payload) with a VPN service SID and SRv6 Policy (Red,10) (e.g., "R10::), resulting in IPv6 packet 331 being sent. Node 202 receives IPv6 packet 331 and performs the End function, resulting in IPv6 packet 332 being sent. Node 204 receives IPv6 packet 332 and performs the End.BM function, resulting in MPLS packet 333 being sent. Node 205 receives MPLS packet 333, performs standard MPLS forwarding processing result in MPLS packet 334 being sent. Node 207 receives and processes MPLS packet 334, resulting in IPv6 Packet 335 (due to Penultimate hop popping (PHP) behavior for Label 16007) being sent. Node 208 receives IPv6 Packet 335 and performs the End(PSP) SR function, resulting in IPv6 packet 336 being sent. Node 210 receives IPv6 packet 336 and performs the SR End.DT function that decapsulates the original IP packet (e.g., End.DT4 for the original IPv4 packet). Node 210 performs an egress forwarding lookup operation on the IP Destination Address of the original IP packet in the corresponding Virtual Routing and Forwarding (VRF) table, and accordingly sends the original packet to the customer edge device.

One embodiment carries SRv6 over SR-MPLS or MPLS using BGP to provide the information to stitch domains of a heterogeneous network. One embodiment uses the following procedure.

For providing services across domains, edge node locators need to be reachable.

Locators are advertised by the edge nodes in the BGP IPv6 unicast address family (AFI=2, Safi=1) to border nodes. These locators are also advertised in its local IGP domain.

On border nodes, these prefixes are like any IPv6 global prefixes. These are advertised in BGP IPv6 LU[AFI=2/SAFI=4] session using RFC 3107 procedures in label core. In one embodiment, a summary prefix is used for all locators in that domain.

A remote domain border router advertising a locator over an SRv6 domain attaches the SRv6 SID in the prefix SID attribute. SRv6 SID, in this case, is an End function of the advertising border node.

An ingress node learns these remote locators over BGP IPv6 address family [AFI=2, SAFI=1]. These locators have a prefix SID attribute containing the SRv6 SID. This SRv6 SID is an End function of advertising border node and is used to tunnel traffic to the border node in the remote domain.

If locators are summarized, one embodiment leaks them in remote IGP and therefore, no tunneling of traffic is required in the remote domain. Hence, attaching SRv6 SID on remote border nodes can be avoided.

The loopback address is advertised in BGP label unicast session to border node when advertised from MPLS domain. These are also advertised in local IGP.

Border nodes advertise prefix over the SRv6 domain in BGP IPv4/IPv6 session. It attaches prefix SID attribute with SRv6 SID. This SRv6 SID maps to label received in prefix update.

Remote border node allocates local label to advertise prefix in MPLS domain to ingress node. This local label maps to received SRv6 SID in prefix SID attribute of the prefix.

Figure 4A:
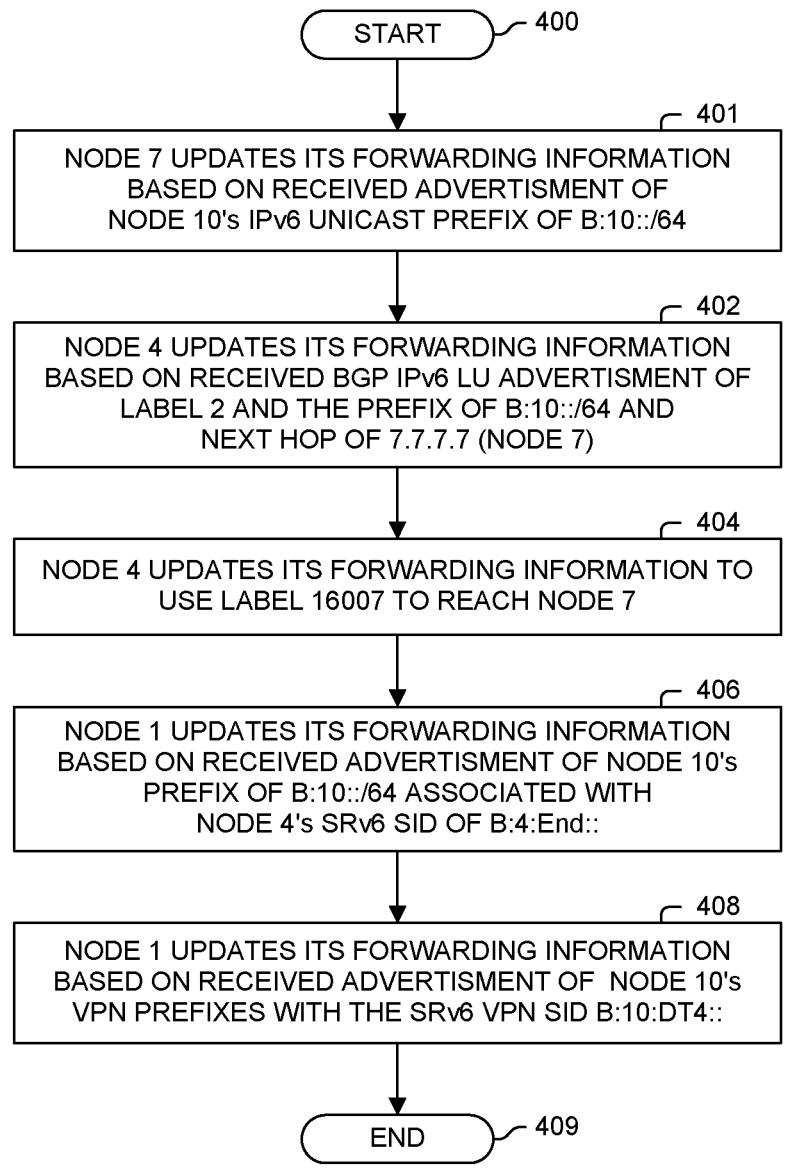
FIG. 4A illustrates a process according to one embodiment.

FIG. 4A illustrates a process performed in one embodiment based on these advertising rules and in the context of multiple domain network 200 of FIG. 2A in illustrating the updating of forwarding data structures in the data planes of domains (221, 222, 223) for forwarding a packet from node 1 (201) to node 10 (210). Processing begins with process block 400.

In process block 401, node 7 updates its forwarding information based on a received advertisement of node 10's IPv6 unicast prefix of B:10::/64.

In process block 401, node 4 updates its forwarding information based on a received BGP IPv6 labeled unicast (BGP-LU) advertisement of MPLS label 2, the prefix of B:10::/64, and next hop of 7.7.7.7 (loopback address of node 7). A MPLS label value of 2 represents the "IPv6 Explicit NULL Label." This label value is typically only legal at the bottom of the label stack. It indicates that the label stack must be popped, and the forwarding of the packet must then be based on the IPv6 header. A BGP speaker uses BGP-LU to attach the MPLS label to an advertised Interior Gateway protocol (IGP) prefix and distribute the MPLS label mapped to the prefix to its peers.

Continuing in process block 404, node 4 updates its forwarding information to use label to reach node 7. In process block 406, node 1 updates its forwarding information based a received advertisement of node 10's prefix of B:10::/64 associated with node 4's SRv6 SID of B:4:End::.

In process block 408, node 1 updates its forwarding information based on a received advertisement of node 10's VPN prefixes with the SRv6 VPN SID of B:10:DT4::.

Processing of the flow diagram of FIG. 4A is complete as indicated by process block 409.

Figure 4B:
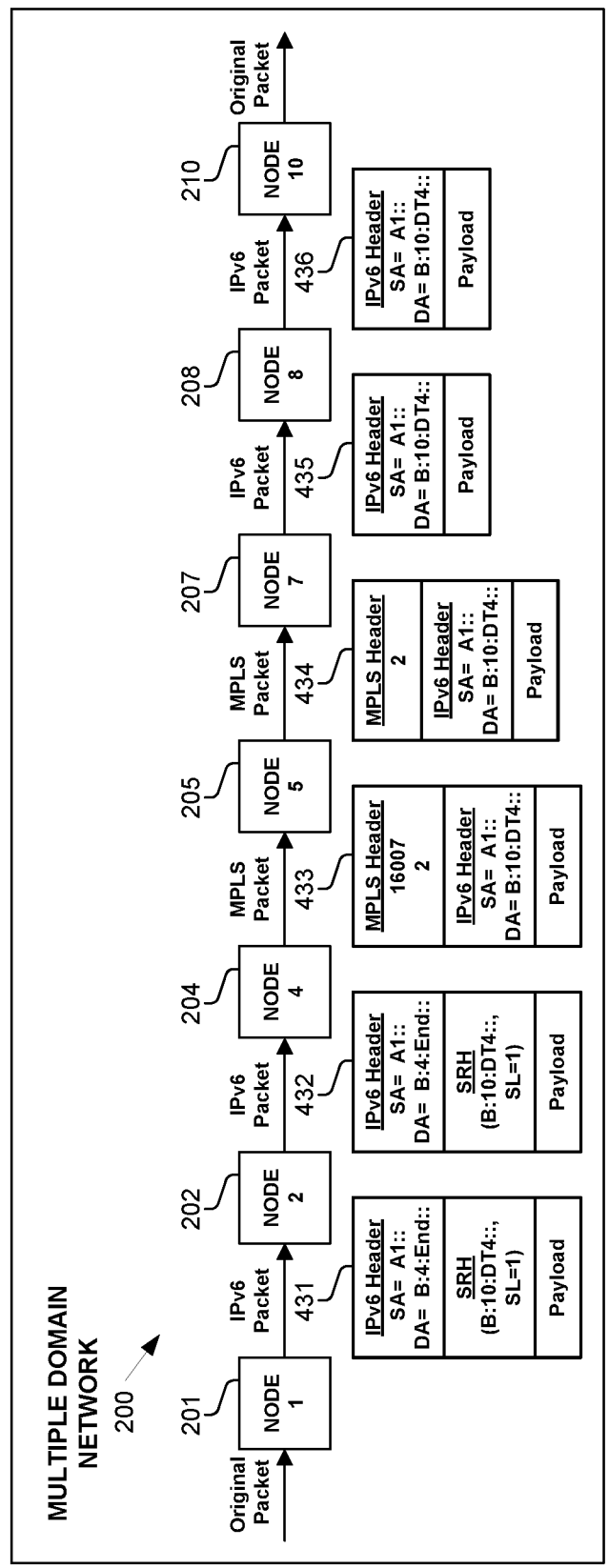
FIG. 4B illustrates a network operating according to one embodiment.

FIG. 4B illustrates data plane processing interworking operations of network 200 (FIG. 2A) corresponding to the control plane configuration performed in FIG. 4A. Edge node 201 operates according to SRv6 function T.Encaps. Red (or T.Encaps) (encapsulating the original packet in the Payload) resulting in IPv6 packet 431 being sent. IPv6 packet 431 includes a IPv6 Destination Address of the BSID of border node 204 and a Segment Routing Header (SRH) including node 210's BSID of B:10:DT4::. Node 202 receives and processes IPv6 packet 431, resulting in IPv6 packet 432 being sent. Node 204 receives and processes IPv6 packet 432 based on its BSID of B:4:End::, updating the destination address of the SRv6 packet with the next SID. The SRH is also removed as there are no more SIDs to subsequently traverse. Node 204 encapsulates the updated IPv6 packet in an MPLS packet 433 with a label stack to reach node 207 and to force decapsulation of the original IP packet (per implicit NULL label 2). Node 204 sends packet 433. Node 205 (or node 206 in one embodiment) receives and processes MPLS packet 433, with MPLS packet 434 being sent. Node 207 receives and processes MPLS packet 434 resulting in encapsulating IPv6 packet 435 being sent. Node 208 receives and processes IPv6 packet 435, resulting in IPv6 packet 436 being sent. Node 210 receives and processes IPv6 packet 436, resulting in original packet (e.g., an IPv4 packet) being sent.

Figure 5A:
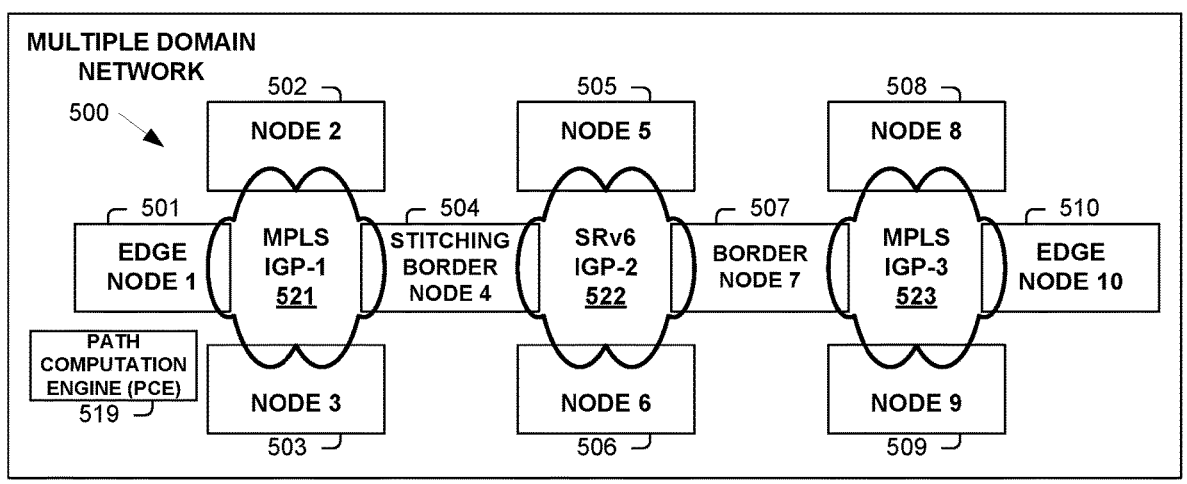
FIG. 5A illustrates a network operating according to one embodiment.

FIG. 5A illustrates a multiple domain network 500 according to one embodiment. Domain network 500 includes three domain networks, with domain networks 521 and 523 forwarding packets (e.g., data plane processing) using MPLS/SR-MPLS and with network 522 forwarding packets using SRv6. However, the teachings discussed in relation to FIG. 5A are also directly applicable to numerous other deployment scenarios and architectures. Domain network 521 includes nodes 501, 502, 503, and 504. Domain 522 includes nodes 504, 505, 506, and 507. Domain network 523 includes nodes 507, 508, 509, and 510. One embodiment includes Path Computation Element (PCE) 519. In one embodiment, multiple domain network 500 includes one or more BGP route reflectors (RRs).

One embodiment uses a software-defined networking approach in transporting SR-MPLS packets over a SRv6 domain 522 in multiple domain network 500 shown in FIG. 5A.

Figure 5B:
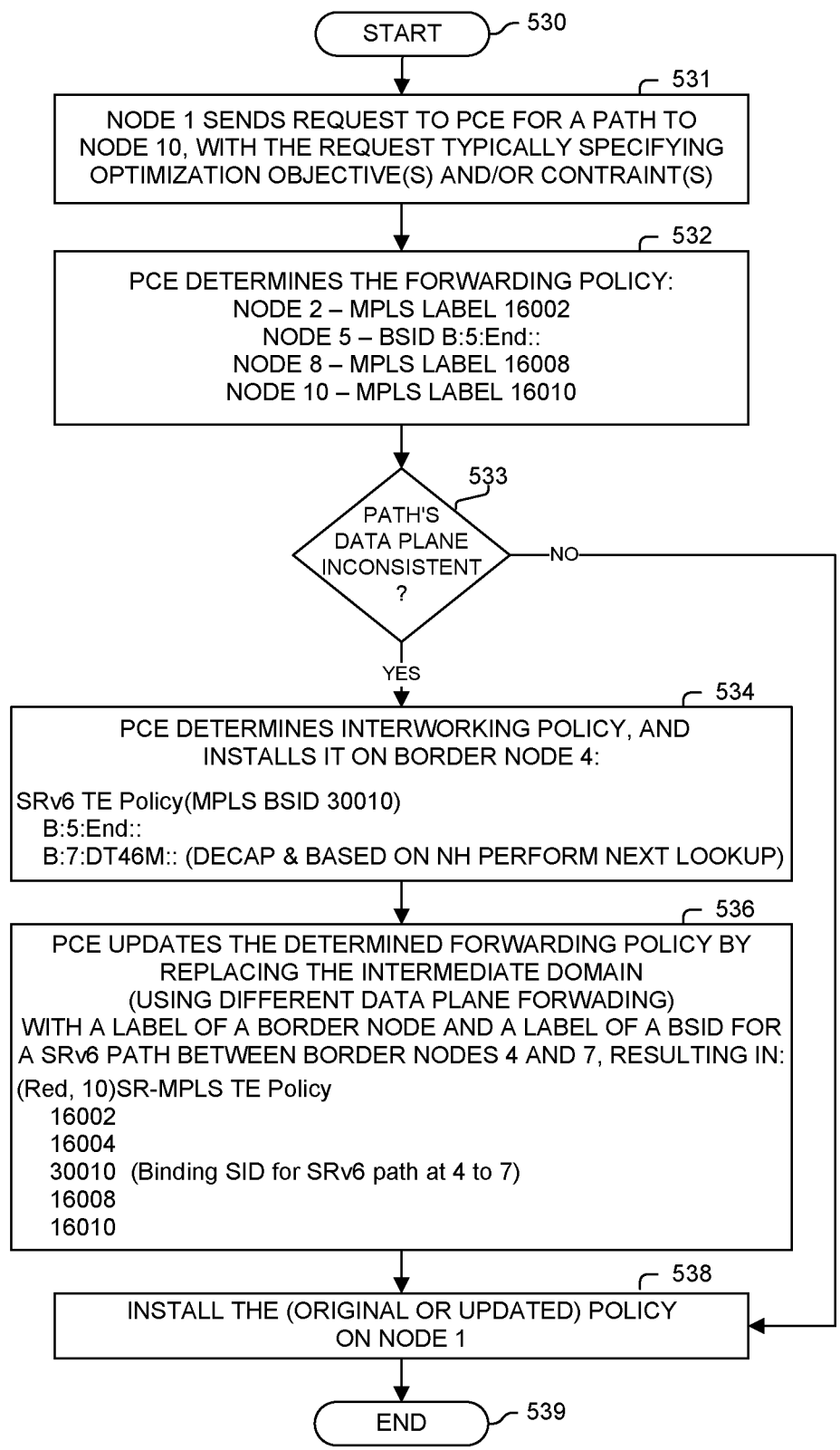
FIG. 5B illustrates a process according to one embodiment.

FIG. 5B illustrates a process performed in one embodiment that traverses an intermediate domain of a heterogeneous data plane network using an MPLS Binding Label representing packet processing behavior to be performed at border node 504 (FIG. 5A) to modify the packet to traverse the intermediate domain network 522's data plane (e.g., using SRv6 to border node 507).

Processes begins with process block 530. In process block 531, node 1 sends a request to the SR PCE for a path to node 10 through network 530, typically with the request including one or more objectives and/or constraints (e.g., to meet the requirements of an SLA). In one embodiment, the request is sent in response to a service prefix (e.g., VPN or EVPN) being received on edge node 1 with a corresponding SLA (e.g., color extended community).

In process block 532, the PCE computes a path/policy from node 1 traversing nodes 2, 5, 8, and 10, with corresponding identifiers: <label 16002, BSID B:5:End::, label 16008, label 16010>.

As determined in process block 533, if there is an inconsistent data plane throughout the path (e.g., SRv6 domain network 522 interconnecting SR-MPLS domain networks 521 and 523), then processing proceeds to process block 534; otherwise, processing proceeds directly to process block 538.

In process block 534, the PCE determines the interworking policy, including a corresponding SRv6 Traffic Engineering (TE) Policy of BSIDs <B:5:End::, D:7:DT46M::>, with this SRv6 TE Policy behavior being invoked on node 4 in response to label 30010. In process block 536, the multiple domain forwarding policy determined in process block 532 is updated by replacing the domain(s) (in this embodiment, domain network 522) with different data plane processing with a transit label of the border node followed by the corresponding label to invoke the behavior of the SRv6 TE Policy between border nodes 4 and 7. The updated multiple domain forwarding policy from node 1 traversing nodes 2, 4, 5, 7, 8, and 10 includes labels <16002, 16004, 30010, 16008, 16010>. Processing proceeds to process block 538.

In process block 538, the original or updated forwarding policy is installed on node 1.

Processing of the flow diagram of FIG. 5B is complete as indicated by process block 539.

In one embodiment, a second "stitching" or interworking policy is installed on border node 7 that will add the MPLS labels/policy to traverse node 8 to reach node 10. In such case, the label stack of the policy installed at edge node 1 contains fewer labels, thus making the packet smaller which may provide packet processing advantages while requiring additional packet processing at node 7.

FIG. 5C illustrates a Segment Routing behavior invoked by the End.DT46M This processing includes performing a decapsulation operation (pop the (outer) IPv6 header and its extension headers) on the received encapsulating packet, and based on next header protocol in the header of the received encapsulating packet, a label lookup, IPv4 lookup, or IPv6 lookup operation is performed in a corresponding table to determine processing (e.g., forwarding) information. Pseudo code 540 of END.DT46M, of one embodiment, is illustrated in FIG. 5C.

Figure 5D:
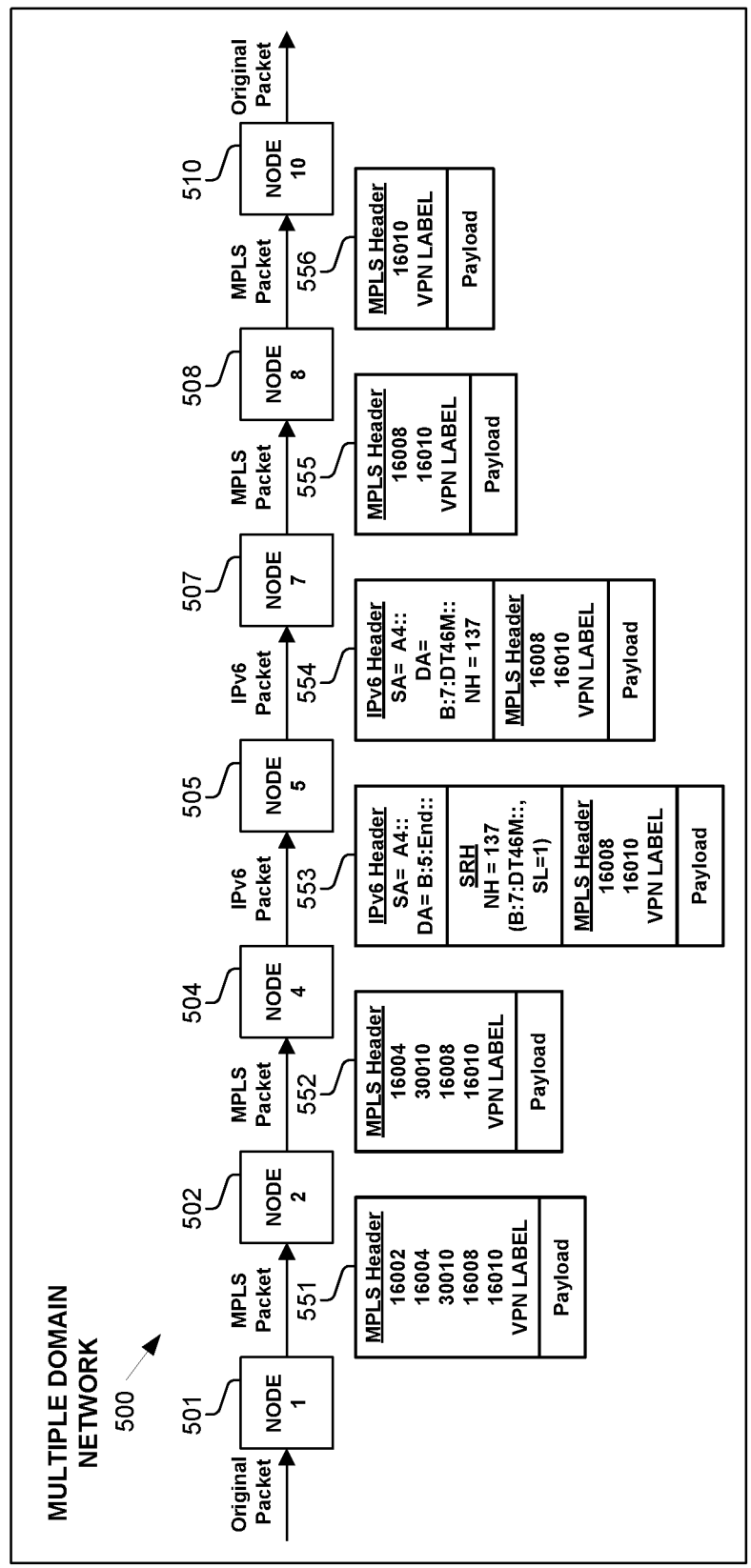
FIG. 5D illustrates a network operating according to one embodiment.

FIG. 5D illustrates data plane processing interworking operations of multiple domain network 500 (FIG. 5A) corresponding to the control plane configuration performed in FIG. 5B. Edge node 501 encapsulates the original (received) packet into MPLS packet 551 with label stack determined in process block 536 (FIG. 5B), plus a corresponding VPN label, to perform the multiple domain forwarding to node 510. MPLS packet 551 is sent by node 501. Node 502 receives and processes MPLS packet 551, resulting in MPLS packet 552 being sent. Border node 504 receives and processes MPLS packet 552. Based on label 30010, the behavior of the binding SID of the SRv6 TE policy (determined in process block 534 of FIG. 5B) is performed to generate IPv6 packet 553 that includes an IP Destination Address of the BSID of node 505, a SRH including the BSID of node 507, and an MPLS header including the remaining labels. Packet 553 is sent. Node 505 receives and processes IPv6 packet 553, resulting in IPv6 packet 554 (with the updated IP Destination Address and the SRH removed) being sent. Node 507 receives IPv6 packet 554 and performs the behavior associated with BSID B:7:DT46M:: that decapsulates the MPLS packet 555 (that includes the original packet in its payload). Based on the next header protocol value of 137 (representing MPLS-in-IP), an MPLS forwarding lookup operation is performed on the top label (16008), and MPLS packet 555 is correspondingly sent. Node 508 receives and processes MPLS packet 555, resulting in MPLS packet 556 being sent. Node 510 receives MPLS packet 555, and decapsulates and sends the original packet.

Figure 5E:
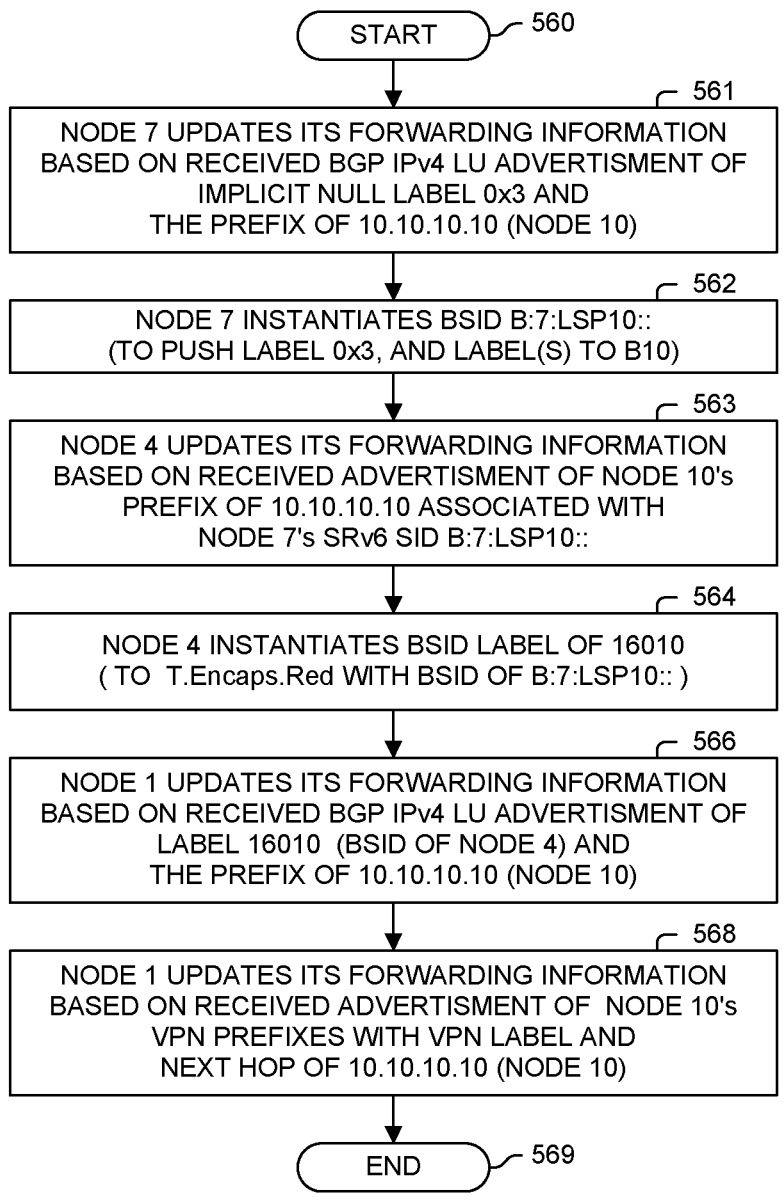
FIG. 5E illustrates a process according to one embodiment.
Figure 5G:
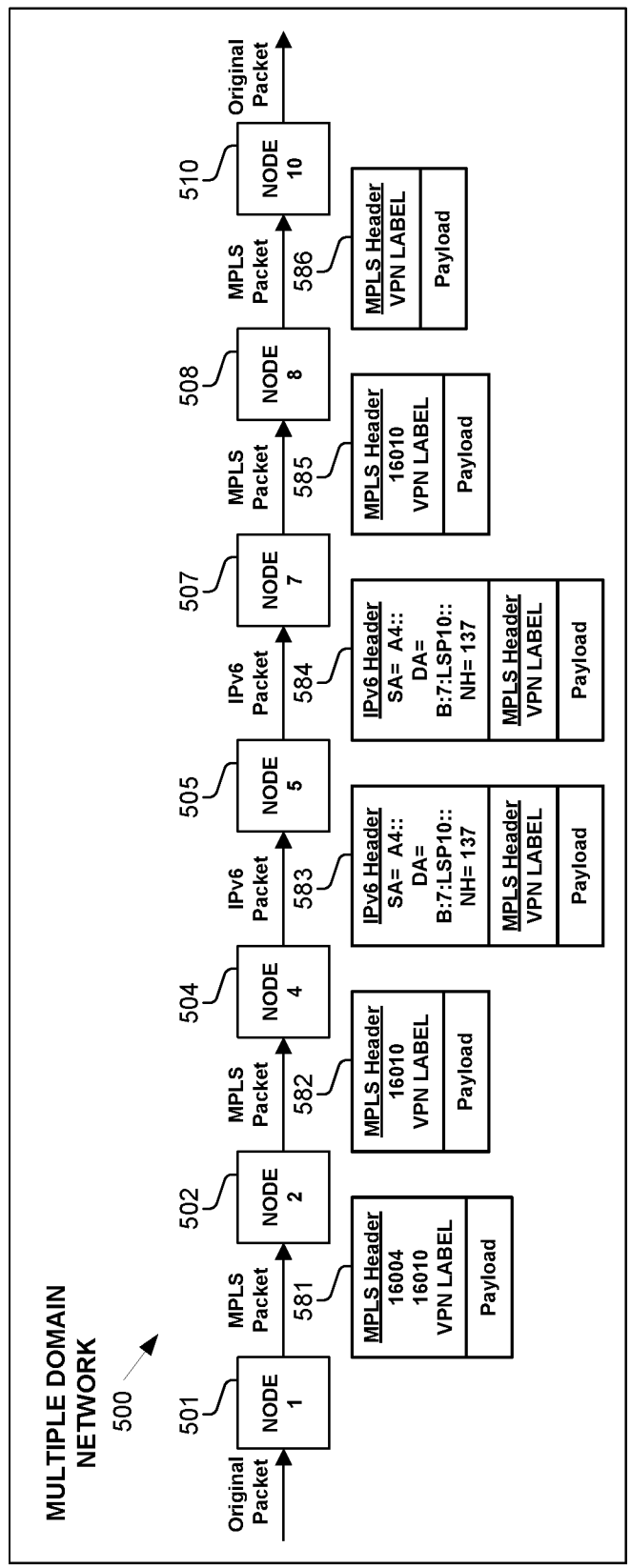
FIG. 5G illustrates a network operating according to one embodiment.

FIGS. 5E-G illustrate one embodiment of network 500 (FIG. 5A) in which multiple domains (521, 522, 523) are stitched using BGP. Although the illustration uses an example of SRv6 over MPLS, it is equally applicable to SRv6 over SR-MPLS. At border (interworking) node 4, an MPLS cross-connect function to SRv6 is used. In one embodiment, border node 4 performs functions, including the following.

- Local label cross connects to an SRv6 encapsulation.
- Local label is programmed to pop and perform T.Encaps.Red (or T.Encaps) with SID.
- Forward based on new SRv6 header.
- The label allocated per LSP bounded to PE locator, similar to MPLS BSID bound to SRv6 policy.

At the border (interworking) node 7, the above-mentioned functionality is realized using the SRv6 SID call END.LSP SID (B:7:LSP10:: at node 7).

FIG. 5E illustrates a process performed in one embodiment. Processing begins with process block 560. In process block 561, node 7 updates its forwarding information based on a received BGP IPv6 labeled unicast (BGP-LU) advertisement of implicit NULL label 0 ×3 and the prefix 10.10.10.10 (node 10).

In process block 562, node 7 installs BSID B:7:LSP10:: to push label 0 ×3 (implicit NULL) and transport label(s) to node 10.

In process block 563, node 4 updates its forwarding information based on a received advertisement of node 10's prefix of 10.10.10.10 associated with node 7's SRv6 SID B:7:LSP10::.

In process block 564, node 4 installs the BSID label of 16010 for invoking T.Encaps. Red (or T.Encaps) to add a BSID of B:7:LSP10::.

In process block 566, node 1 updates its forwarding information based on a received BGP IPv6 labeled unicast (BGP-LU) advertisement of label 16010 (BSID of node 4) and the prefix 10.10.10.10 (e.g., loopback address of node 10).

In process block 568, node 1 updates its forwarding information based on a received advertisement of node 10's VPN prefixes with the VPN label and next hop of 10.10.10.10.

Processing of the flow diagram of FIG. 5E is complete as indicated by process block 569.

FIG. 5F illustrates a Segment Routing behavior invoked by the End.LSP SID. This processing includes performing a decapsulation operation (pop the (outer) IPv6 header and its extension headers) on the received encapsulating packet, and adding the label stack (e.g., BGP LU received labels for the provider edge loopback and transport labels to the nexthop bound to the SID) to the decapsulated MPLS packet or to a created MPLS packet encapsulating the original packet. Pseudo code 570 of End.LSP SID, of one embodiment, is illustrated in FIG. 5F.

FIG. 5G illustrates data plane processing interworking operations of multiple domain network 500 (FIG. 5A) corresponding to the control plane configuration performed in FIG. 5E. Edge node 501 encapsulates the original (received) packet into MPLS packet 581 with label stack determined from advertisements for reaching node 510. In one embodiment, this label stack includes a transport label to interworking (border) node 504, the label to cause border node 504 to invoke the behavior of T.Encaps.Red (or T.Encaps), and a corresponding VPN label. Node 501 sends MPLS packet 581. Node 502 receives and processes MPLS packet 581, resulting in MPLS packet 582 being sent. Border node 504 receives and processes MPLS packet 582. Responsive to label 16010, T.Encaps.Red (or T.Encaps) SID behavior is performed to generate and send IPv6 packet 583 including the Destination Address of the BSID of border node 584. Node 505 receives and processes IPv6 packet 583, resulting in IPv6 packet 584 being sent. Node 507 receives IPv6 packet 584 with the Destination Address of BSID B:7:LSP10::, invoking corresponding End.LSP behavior that includes removing the IPv6 header, adding to the label stack (currently including the VPN Label) of the decapsulated MPLS packet. The added label(s) include the received advertised label (which is implicit NULL in this scenario identifying no advertised label added) plus transport label 16010 for reaching node 510. Node 507 sends packet 585. Node 508 receives and processes MPLS packet 585, resulting in MPLS packet 586 being sent. Node 510 receives MPLS packet 586, and decapsulates and sends the original packet.

Figure 6A:
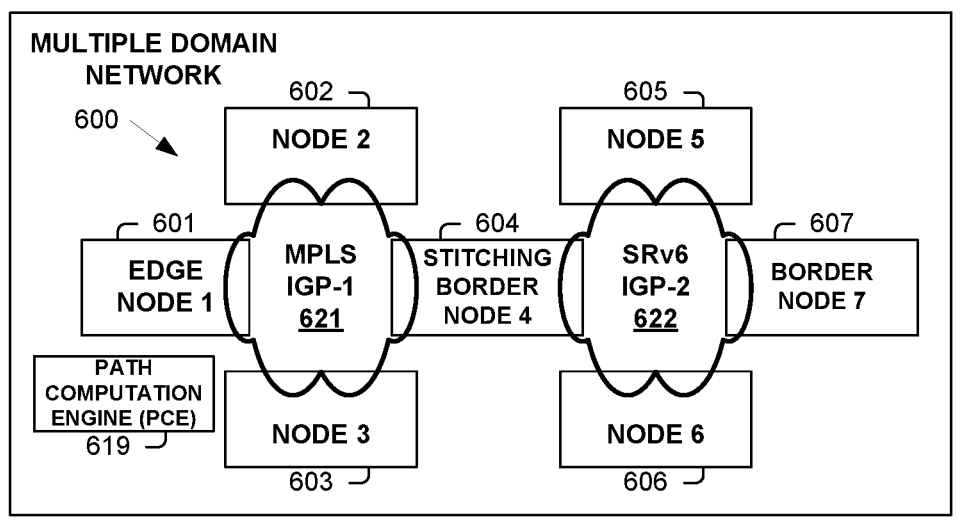
FIG. 6A illustrates a network operating according to one embodiment.

FIG. 6A illustrates a multiple domain network 600 according to one embodiment. Network 600 includes two domain networks, with network 621 forwarding packets (e.g., data plane processing) using SR-MPLS and with network 622 forwarding packets using SRv6. However, the teachings discussed in relation to FIG. 6A are also directly applicable to numerous other deployment scenarios and architectures. Network 621 includes nodes 601, 602, 603, and 604. Network 622 includes nodes 604, 605, 606, and 607. One embodiment includes a Path Computation Element (PCE) 619. In one embodiment, network 600 includes one or more BGP route reflectors (RRs).

One embodiment performs SR-MPLS to SRv6 (Mto6) translation. One embodiment uses BGP inter domain or ODN multi-domain stitching use SRv6 edge nodes that can process VPN/service labels. According to one embodiment in the Mto6 scenario, traffic is received with a SRv6 SID and a VPN label below into egress PE. Typically, the egress SRv6-capable node processes VPN label(s) after decapsulating the SRv6 SID and when next header is 137 in IPv6 header. In one embodiment, service information encoded by the MPLS edge node is a VPN label/service label or the IP payload for IP traffic.

One embodiment uses a software-defined networking approach for SR-MPLS to SRv6 (Mto6) translation using BSID End.BT46M (e.g., pseudo code shown in FIG. 5C).

Figure 6B:
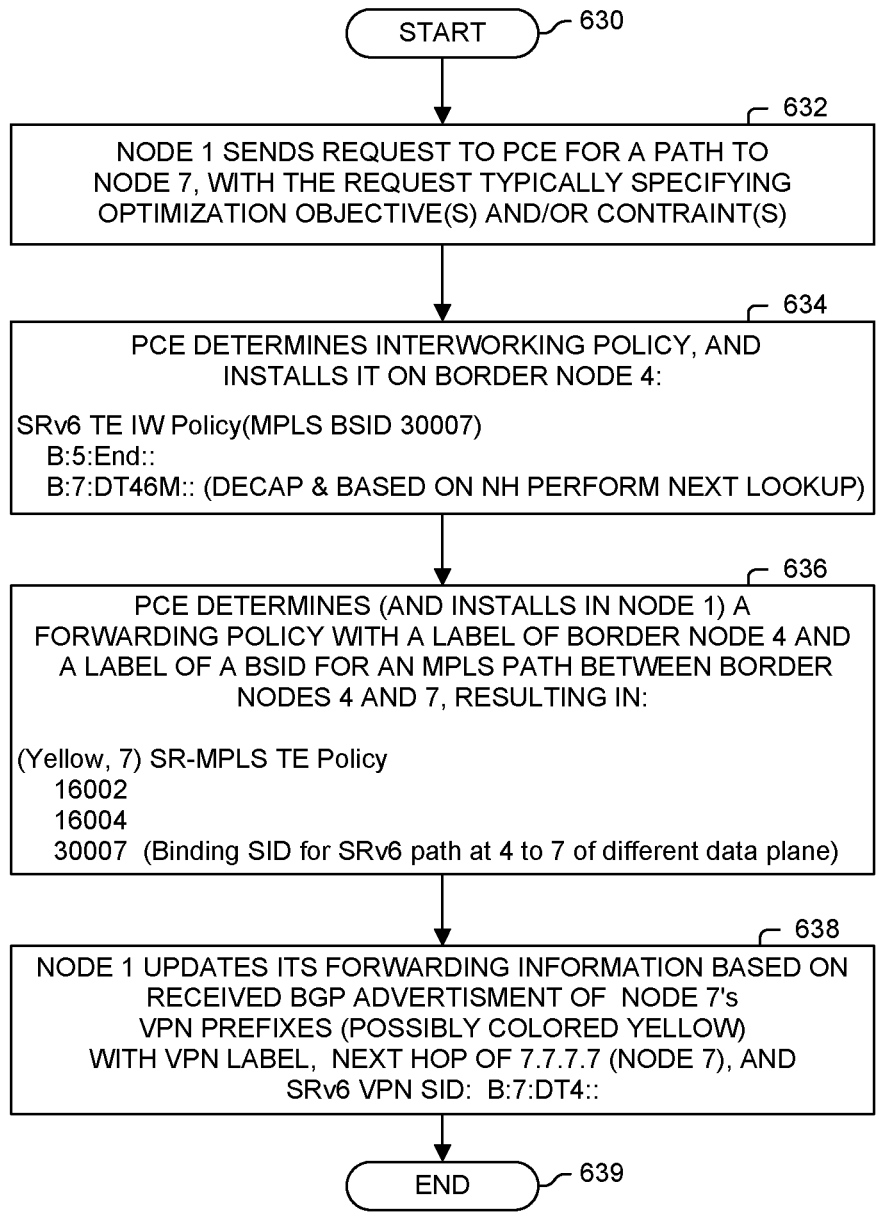
FIG. 6B illustrates a process according to one embodiment.

FIG. 6B illustrates a process performed in one embodiment. Processing begins with process block 630. In process block 632, node 1 sends a request to the PCE for a path to node 7 in network 600 (FIG. 6A). Typically, the request includes one or more objectives and/or constraints (e.g., to meet the requirements of an SLA). In one embodiment, the request is sent in response to a service prefix (e.g., VPN or EVPN) being received on edge node 1 with a corresponding SLA (e.g., color extended community).

In process block 634, the PCE determines the interworking policy and installs it on border node 4. In one embodiment, this interworking policy [SRv6 TE IW Policy(MPLS BSID 30007)] includes the BSIDs of <B:5:End::, B:7:DT46M::>.

In process block 636, the PCE determines (and installs in node 1) a forwarding policy with a label of border node 4 and a label of a BSID for an MPLS path (e.g., tunnel) between border nodes 1 and 4. In one embodiment, this interworking policy [(Yellow, 7) SR-MPLS TE Policy] includes the labels of <16002, 16004, 30007>. Label 30007 corresponds to a BSID for the SRv6 policy of a path from node 4 to node 7.

In process block 638, node 1 updates its forwarding information based on a received BGP advertisement of node 7's VPN prefixes (possibly colored yellow in one embodiment), with a corresponding VPN LABEL, next hop of 7.7.7.7 (node 7), and SRv6 VPN SID: B:7:DT4:: (of node 7).

Processing of the flow diagram of FIG. 6B is complete as indicated by process block 639.

Figure 6C:
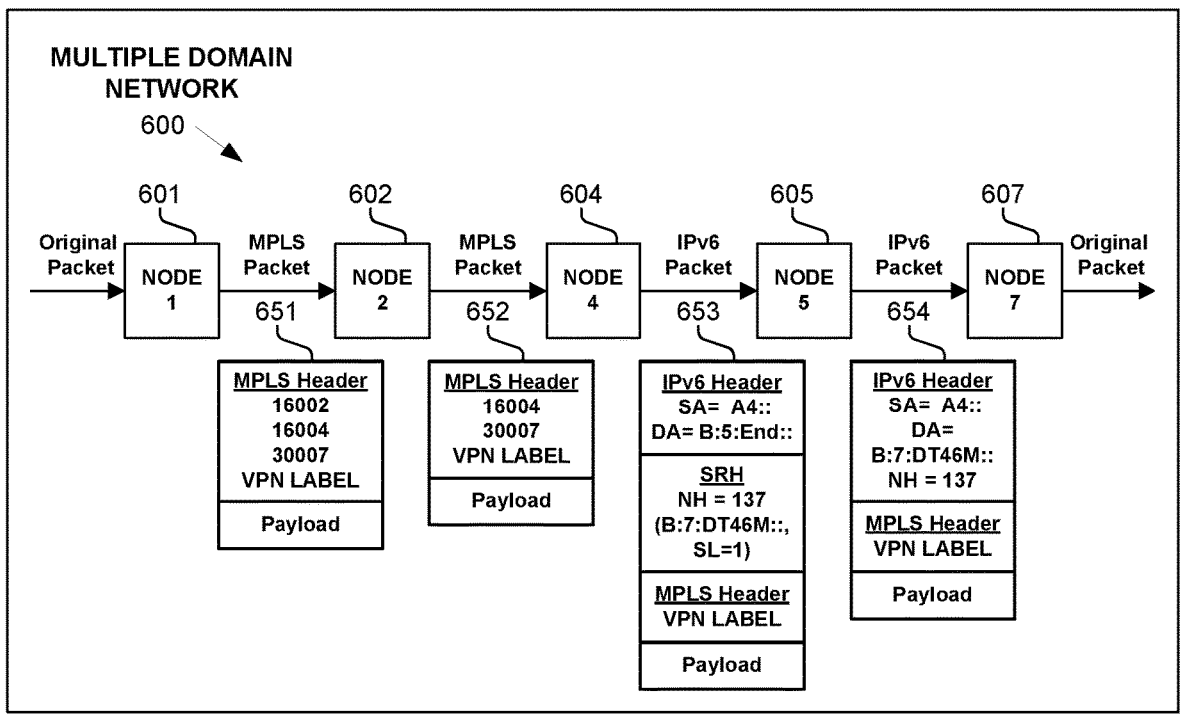
FIG. 6C illustrates a network operating according to one embodiment.

FIG. 6C illustrates data plane processing interworking operations of network 600 (FIG. 6A) corresponding to the control plane configuration performed in FIG. 6B. Edge node 601 encapsulates the original packet into MPLS packet 651 with the label stack determined in process block 636 (FIG. 6B). Node 601 sends MPLS packet 651. Node 602 receives and processes MPLS packet 651, resulting in the sending of MPLS packet 652. Node 604 receives MPLS packet 652 with label 30007 identifying a BSID to invoke behavior to add a Segment Routing policy to transport an SRv6 encapsulating packet to node 607 through SRv6 domain 622. Responsive to label 30007, node 604 generates IPv6 (SRv6) packet 653 including BSIDs <B:5:End::, B:7:DT46M::>. Node 604 sends IPv6 packet 653. Node 605 receives and process IPv6 packet 653, resulting in the sending of IPv6 packet 654 (updated to remove the SRH and with a Destination Address of node 607's BSID of B:7:DT46M::). Node 607 receives and processes IPv6 packet 654 according to the Segment Routing behavior associated with B:7:DT46M::. Responsive to the decapsulation operation and with the Next Header having a value of 137 (i.e., identifying MPLS-in-IP) and to the VPN label (e.g., identifying a VRF in which to perform the packet processing lookup operation), node 607 performs an egress lookup operation, and correspondingly sends the decapsulated original packet.

Figure 6D:
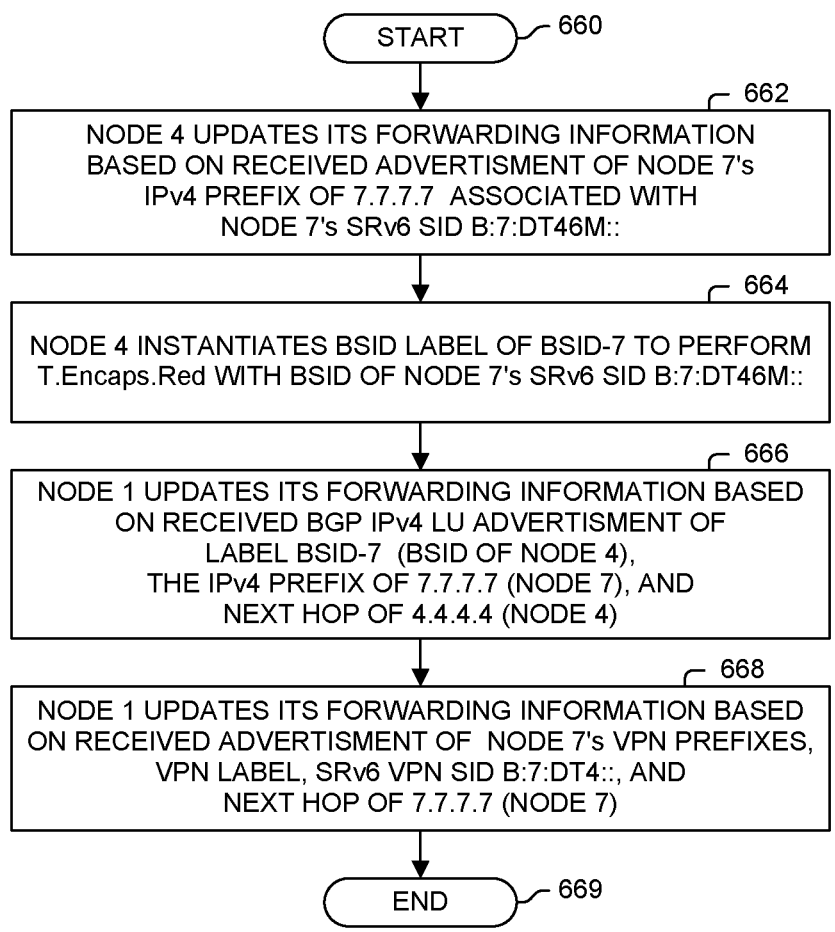
FIG. 6D illustrates a process according to one embodiment.
Figure 6E:
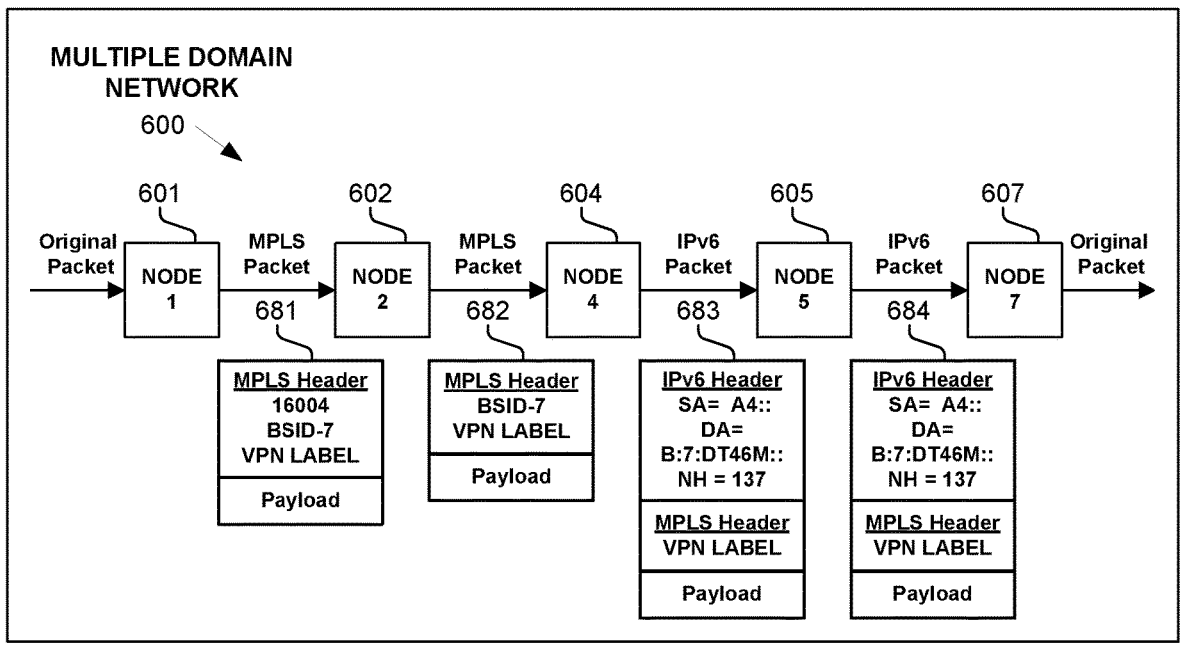
FIG. 6E illustrates a network operating according to one embodiment.

FIGS. 6D-E illustrate one embodiment of network 600 (FIG. 6A) in which multiple domains (621, 622) are stitched using BGP. At border (interworking) node 604, an MPLS cross-connect function to SRv6 is used. In one embodiment, border node 604 performs functions, including the following.

The Binding SID to perform the interworking function at the interworking node (node 604 in the following example) is exchanged via BGP-LU.

END.DT46M SID (e.g., pseudo code illustrated in FIG. 5C) is used to decapsulate the original packet at the exit node (node 607).

FIG. 6D illustrates a process performed in one embodiment. Processing begins with process block 660. In process block 662, node 4 updates its forwarding information based on a received BGP IPv6 labeled unicast (BGP-LU) advertisement of node 7's IPv4 prefix of 7.7.7.7, next hop of 4.4.4.4, and label BSID-7.

In process block 664, node 4 installs BSID label of BSID-7 to perform T.Encaps.Red with node 7's SRv6 SID B:7:DT46M::.

In process block 666, node 1 updates its forwarding information based on received BGP IPv4 LU advertisement of label BSID-7 (a BSID of node 4), the IPv4 prefix of 7.7.7.7 (node 7), and next hop 4.4.4.4 (node 4).

In process block 668, node 1 updates its forwarding information based on a received advertisement of node 7's VPN prefixes, VPN label, SRv6 VPN SID B:7:DT4::, and next hop of 7.7.7.7 (node 7).

Processing of the flow diagram of FIG. 6D is complete as indicated by process block 669.

FIG. 6E illustrates data plane processing interworking operations of network 600 (FIG. 6A) corresponding to the control plane configuration performed in FIG. 6D. Edge node 601 encapsulates the original packet into MPLS packet 681, with a label stack including labels 16004, BSID-7, and a corresponding VPN Label. Node 601 sends MPLS packet 681. Node 602 receives and processes MPLS packet 681, resulting in the sending of MPLS packet 682. Node 604 receives MPLS packet 682, which performs the Segment Routing behavior corresponding to label BSID-7 resulting in IPv6 packet 683, that includes a Destination Address of B:7:DT46M::. Node 604 sends IPv6 packet 683. Node 605 receives and processes IPv6 packet 683, resulting in the sending of IPv6 packet 684. Node 607 receives and processes IPv6 packet 684 according to the Segment Routing behavior associated with MPLS label BSID-7. Responsive to decapsulation operation and having a value of 137 (i.e., identifying MPLS-in-IP) and to the VPN label (e.g., identifying a VRF in which to perform the packet processing lookup operation), node 607 performs an egress lookup operation, and correspondingly sends the decapsulated original packet.

One embodiment performs SRv6 to SR-MPLS (6toM) translation. In one embodiment, for 6toM and Mto6 BGP inter domain or ODN multi-domain stitching use SRv6 edge nodes that can process VPN/service labels. According to one embodiment in the 6toM scenario, the ingress node encapsulates the VPN label and then perform a T.Encap function with SRv6 SID associated with prefix nexthop. In one embodiment, service information encoded by the SRv6 PE is a SRv6 Service SID. In one embodiment, when the SRv6 PE does not support VPN labels, then one embodiment performs special handling to translate a SRv6 service SID to a VPN label and vice versa at border nodes.

Figure 7A:
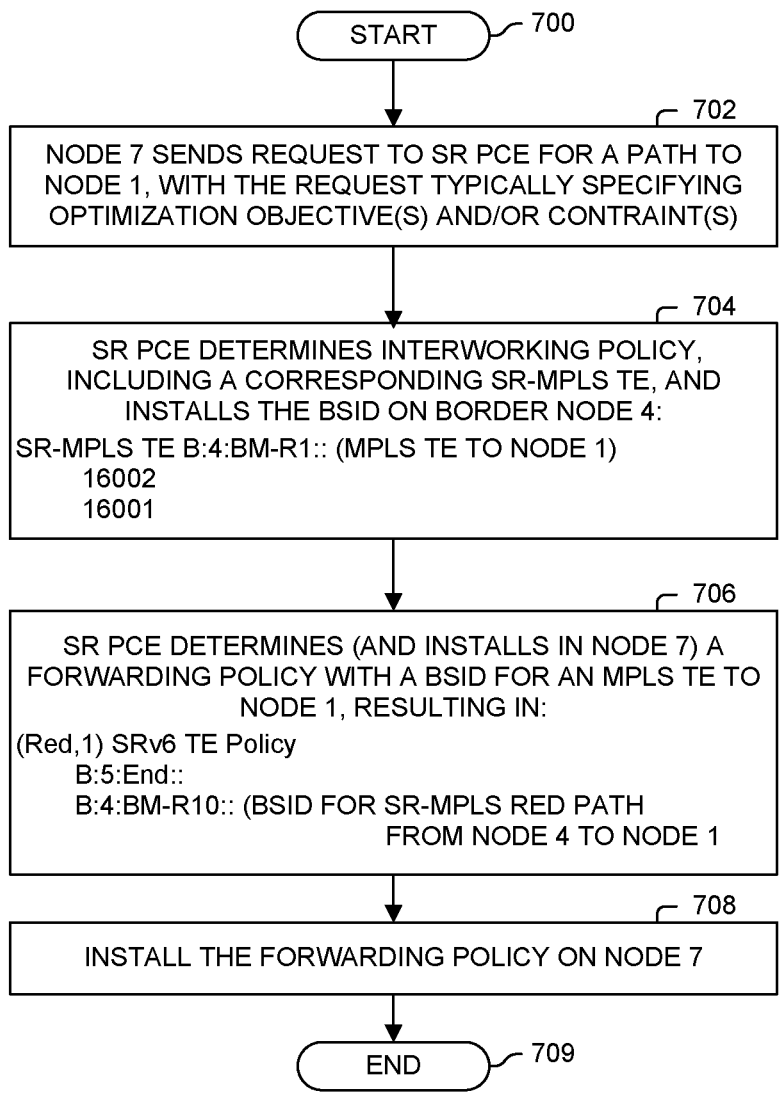
FIG. 7A illustrates a process according to one embodiment.

One embodiment uses a software-defined networking approach for SRv6 to SR-MPLS (6toM) translation. FIG. 7A illustrates a process performed in one embodiment. Processing begins with process block 700. In process block 702, node 7 sends a request to the PCE for a path to node 1 in network 600 (e.g., from right to left as shown in FIG. 6A). Typically, the request includes one or more objectives and/or constraints (e.g., to meet the requirements of an SLA). In one embodiment, the request is sent in response to a service prefix (e.g., VPN or EVPN) being received on edge node 7 with a corresponding SLA (e.g., color extended community).

In process block 704, the PCE determines the interworking policy, including a SR-MPLS TE, and installs the BSID on border node 4. In one embodiment, this interworking policy identified by BSID B:4:BM-R1:: includes labels <16002, 16001>.

In process block 706, the PCE determines (and installs in node 7) a forwarding policy with a BSID of border node 4 for a MPLS TE between border nodes 4 and 1. In one embodiment, this interworking policy [(Red,1) SRv6 TE Policy] includes the BSIDs <B:5:End::, B:4:BM-R10::>, with latter being the BSID for the SR-MPLS red tunnel from node 4 to node 1).

In process block 708, this interworking policy (Red,1) SRv6 TE Policy is installed on node 7.

Processing of the flow diagram of FIG. 7A is complete as indicated by process block 709.

Figure 7B:
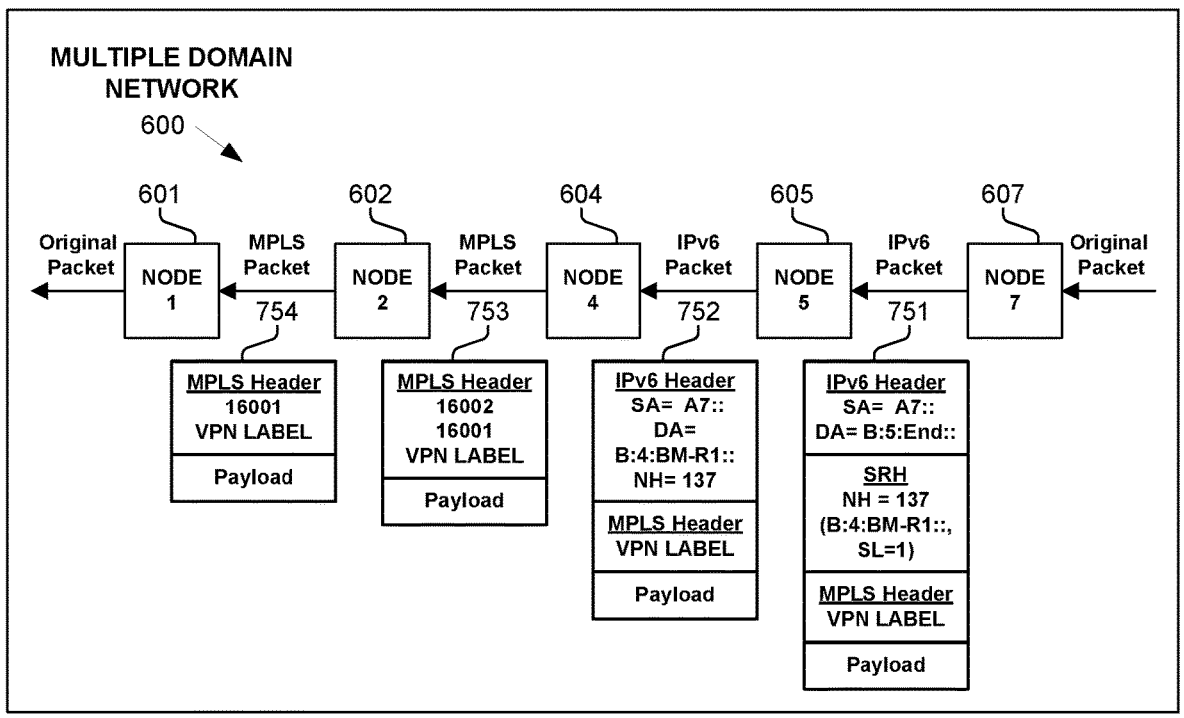
FIG. 7B illustrates a network operating according to one embodiment.

FIG. 7B illustrates data plane processing interworking operations of network 600 (FIG. 6A) corresponding to the control plane configuration performed in FIG. 7A. Edge node 607 encapsulates the original (e.g., received) packet into IPv6 packet 751, that includes a Destination Address of B:5:End:: (of node 605), a SRH including BSID B:4:BM-R1:: (of node 4), and a corresponding MPLS VPN Label. Node 607 sends IPv6 (SRv6) packet 751. Node 605 receives and processes IPv6 packet 751, resulting in the sending of IPv6 packet 752, including a Destination Address of B:4:BM-R1::. Border node 604 receives and processes IPv6 packet 752 based on the Segment Routing behavior associated with BSID B:4:BM-R1::, resulting in the sending of MPLS packet 753 including the label stack (determined in process block 704 of FIG. 7A) of labels 16002 (node 602), 16001 (node 601), and the VPN Label. Node 602 receives and processes MPLS packet 753, resulting in the sending of MPLS packet 754. Node 1 receives and processes MPLS packet 754. Node 607 decapsulates the original packet, performs an egress lookup operation in the VRF corresponding to the VPN label, and correspondingly sends the decapsulated original packet.

Figure 7C:
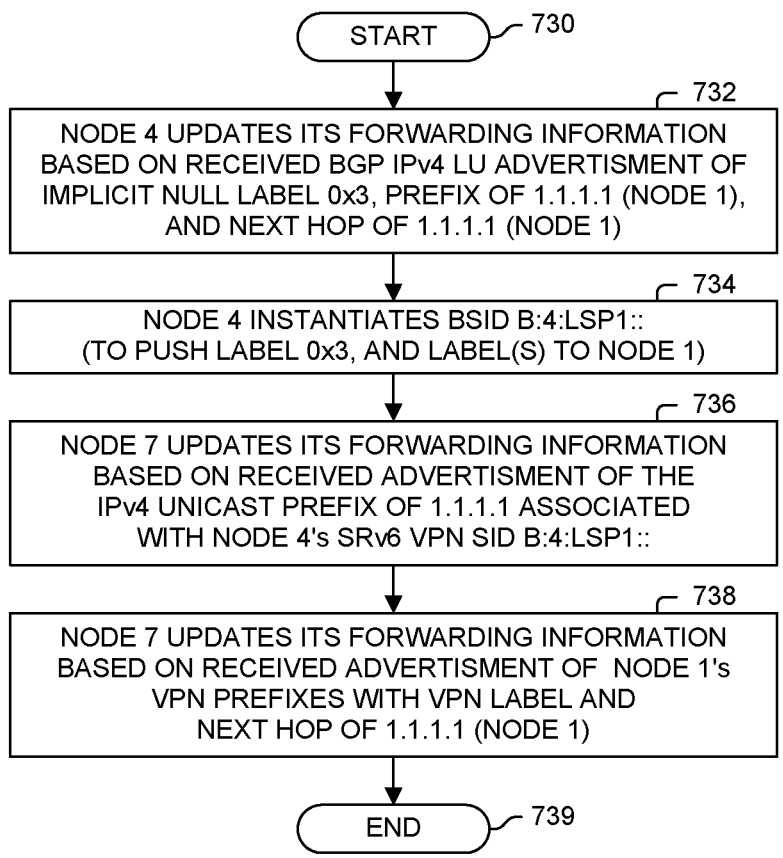
FIG. 7C illustrates a process according to one embodiment.
Figure 7D:
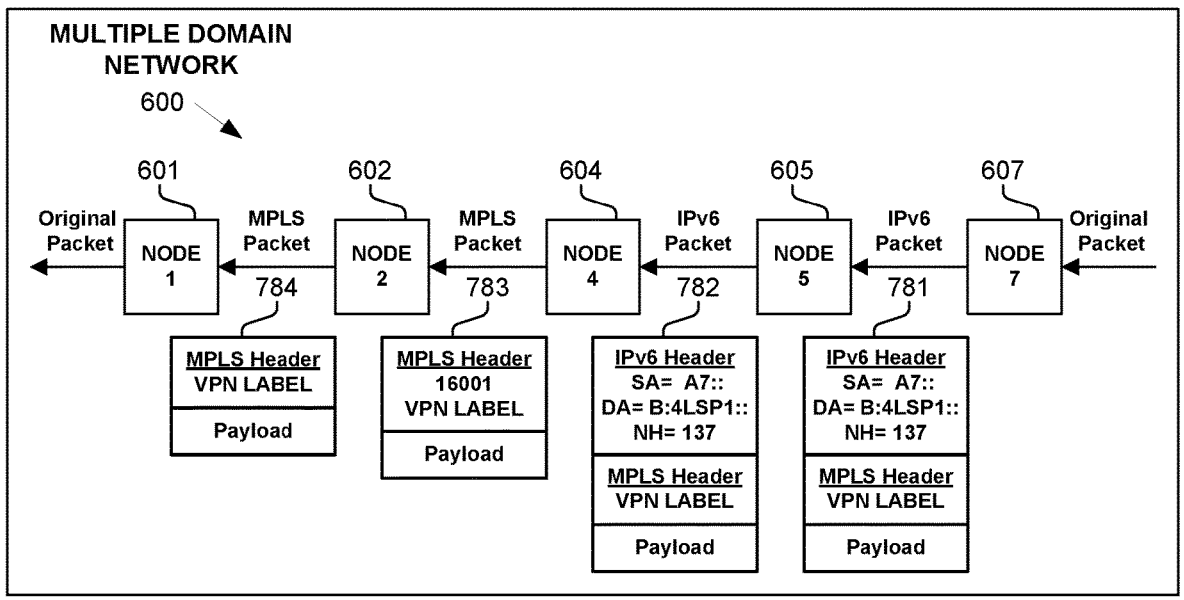
FIG. 7D illustrates a network operating according to one embodiment.

FIGS. 7C-D illustrate one embodiment of multiple domain network 600 (FIG. 6A) in which multiple domains (621, 622) are stitched using BGP and using the END.LSP interworking SID (e.g., having pseudo code illustrated in FIG. 5F).

FIG. 7C illustrates a process performed in one embodiment. Processing begins with process block 730. In process block 732, node 4 updates its forwarding information based on a received BGP IPv6 labeled unicast (BGP-LU) advertisement of implicit NULL label 0 ×3, node 1's IPv4 prefix of 1.1.1.1 and next hop of 1.1.1.1.

In process block 734, node 4 installs BSID B:4:LSP1:: (e.g., to push the implicit NULL label and transit labels to node 1).

In process block 736, node 7 updates its forwarding information based on received advertisement of IPv4 unicast prefix of 1.1.1.1. associated with Node 4's SRv6 VPN SID B:4:LSP1::.

In process block 738, node 7 updates its forwarding information based on the received advertisement of node 1's VPN prefixes with VPN Label and next hop of 1.1.1.1 (node 1).

Processing of the flow diagram of FIG. 7C is complete as indicated by process block 739.

FIG. 7D illustrates data plane processing interworking operations of network 600 (FIG. 6A) corresponding to the control plane configuration performed in FIG. 7C. Edge node 607 encapsulates the original(received) packet into IPv6 packet 781, with a Destination Address of B:4LSP1:: and a corresponding MPLS VPN Label. Node 607 sends IPv6 packet 781. Node 605 receives and processes IPv6 packet 781, resulting in the sending of IPv6 packet 782. Border node 604 receives and processes IPv6 packet 782 with the Destination Address of BSID B:4LSP1::, invoking corresponding Segment Routing behavior of End.LSP, that includes removing the IPv6 header, and adding a forwarding policy to the label stack (currently having the VPN Label) of the decapsulated MPLS packet. The added label(s) include the received advertised label (which is implicit NULL in this scenario identifying no advertised label added) plus transport label 16001 for reaching node 601. Node 604 send MPLS packet 783. Node 602 receives and processes MPLS packet 783, resulting in MPLS packet 784 being sent. Node 601 receives MPLS packet 784, and decapsulates and sends the original packet.

In summary, in one embodiment, a network comprises a first forwarding domain using a first data plane forwarding protocol and a second forwarding domain using a second data plane forwarding protocol different than the first data forwarding plane forwarding protocol. The first forwarding domain includes a first path node and a particular border node. The second forwarding domain includes a second path node and the particular border node. The particular border node performs Segment Routing or other protocol interworking between the different data plane forwarding domains, such as for transporting packets through a different forwarding domain or translating a packet to use a different data forwarding protocol. These forwarding domains typically include Segment Routing (SR) and SR-Multiprotocol Label Switching (SR-MPLS). Paths through the network are determined by a Path Computation Engine and/or based on route advertisements such associated with Binding Segment Identifiers (BSIDs) (e.g., labels, Internet Protocol version 6 addresses).

In view of the many possible embodiments to which the principles of the disclosure may be applied, it will be appreciated that the embodiments and aspects thereof described herein with respect to the drawings/figures are only illustrative and should not be taken as limiting the scope of the disclosure. For example, and as would be apparent to one skilled in the art, many of the process block operations can be re-ordered to be performed before, after, or substantially concurrent with other operations. Also, many different forms of data structures could be used in various embodiments. The disclosure as described herein contemplates all such embodiments as may come within the scope of the following claims and equivalents thereof.

What is claimed is:

1. A border network device for operating in a network comprising a first forwarding domain using a Segment Routing (SRv6) data plane forwarding protocol and a second forwarding domain using a Segment Routing Multiprotocol Label Switching (SR-MPLS) data plane forwarding protocol, the border network device comprising:
   a memory, one or more processors and two or more communication ports; the memory coupled to the one or more processors, the memory storing instructions which when executed by the one or more processors causes the border network device to:
   install a Segment Routing interworking policy received from a network element remote from the border network device, with the Segment Routing interworking policy associated with a second path determined through the first and second forwarding domains in response to an identification that the first and second forwarding domains use different forwarding protocols, with the Segment Routing interworking policy identified by a SRv6 binding segment identifier (BSID) and including an MPLS label stack to be used in forwarding packets through the second forwarding domain, with the MPLS stack comprising one or more MPLS labels corresponding to respective nodes of the second forwarding domain;
   responsive to a received SRv6 packet with a Destination Address including the BSID from a node in the first forwarding domain, invoke the Segment Routing interworking policy to generate an SR-MPLS packet by:
      creating an SR-MPLS header with at least the MPLS label stack; and
      encapsulating the SRv6 packet with the SR-MPLS header; and
      send the SR-MPLS packet into the second forwarding domain of the network.

2. The border network device of claim 1, wherein said received SRv6 packet includes a Segment Routing Header (SRH) including a Segment List including one or more SRv6 Segment Identifiers (SIDs) and a Segments Left identifying a next SID in the Segment List; and
   wherein said invoked Segment Routing Interworking policy includes changing the Destination Address of the SRv6 packet to the next SID and decreasing a value of the Segments Left.

3. The border network device of claim 2, wherein the network includes a third forwarding domain using a SRv6 data plane forwarding protocol and including a third network node having a network address of the next SID.

4. The border network device of claim 3, wherein the network element is a path computation engine.

5. The border network device of claim 1, wherein said invoked Segment Routing Interworking policy includes changing the Destination Address of the SRv6 packet to a different Internet Protocol version 6 (IPv6) address comprising a Segment Identifier (SID) included in said received SRv6 packet.

6. The border network device of claim 5, wherein the network includes a third forwarding domain, using a SRv6 data plane forwarding protocol and including a third network node having a network address of the different IPv6 address.

7. The border network device of claim 6, wherein the network element is a path computation engine.

8. The border network device of claim 1, wherein the network element is a path computation engine.

9. The border network device of claim 1, wherein the second forwarding domain includes a second path node associated with a MPLS label of said one or more MPLS labels; and
   wherein the border network device includes instructions which when executed by the one or more processors causes the border network device to advertise a route advertisement associating the second path node with the BSID.

10. A method performed in a border network device for operating in a network comprising a first forwarding domain using an Internet Protocol version 6 (IPv6) Segment Routing (SRv6) data plane forwarding protocol and a second forwarding domain using a Segment Routing Multiprotocol Label Switching (SR-MPLS) data plane forwarding protocol, with the method comprising:
   installing a Segment Routing interworking policy received from a network element remote from the border network device, with the Segment Routing interworking policy associated with a second path determined through the first and second forwarding domains in response to an identification that the first and second forwarding domains use different forwarding protocols, with the Segment Routing interworking policy identified by a SRv6 binding segment identifier (BSID) and including an MPLS label stack to be used in forwarding packets through the second forwarding domain, with the MPLS stack comprising one or more MPLS labels corresponding to respective nodes of the second forwarding domain;
   responsive to a received SRv6 packet with a Destination Address including the BSID from a node in the first forwarding domain, invoking the Segment Routing interworking policy to generate an SR-MPLS packet by:
creating an SR-MPLS header with at least the MPLS label stack; and
encapsulating the SRv6 packet with the SR-MPLS header; and
sending the SR-MPLS packet into the second forwarding domain of the network.

11. The method of claim 10, wherein said received SRv6 packet includes a Segment Routing Header (SRH) including a Segment List including one or more SRv6 Segment Identifiers (SIDs) and a Segments Left identifying a next SID in the Segment List; and
wherein said invoked Segment Routing Interworking policy includes changing the Destination Address of the SRv6 packet to the next SID and decreasing a value of the Segments Left.

12. The method of claim 11, wherein the network includes a third forwarding domain using a SRv6 data plane forwarding protocol and including a third network node having a network address of the next SID.

13. The method of claim 12, wherein the network element is a path computation engine.

14. The method of claim 10, wherein said invoked Segment Routing Interworking policy includes changing the Destination Address of the SRv6 packet to a different Internet Protocol version 6 (IPv6) address comprising a Segment Identifier (SID) included in said received SRv6 packet.

15. The method of claim 14, wherein the network includes a third forwarding domain, using a SRv6 data plane forwarding protocol and including a third network node having a network address of the different IPv6 address.

16. The method of claim 15, wherein the network element is a path computation engine.

17. The method of claim 10, wherein the network element is a path computation engine.

18. The method of claim 10, wherein the second forwarding domain includes a second path node associated with a MPLS label of said one or more MPLS labels; and
the method comprising advertising a route advertisement associating the second path node with the BSID.

19. A non-transitory computer readable medium storing instructions for use by a border network device operating in a network comprising a first forwarding domain using an Internet Protocol version 6 (IPv6) Segment Routing (SRv6) data plane forwarding protocol and a second forwarding domain using a Segment Routing Multiprotocol Label Switching (SR-MPLS) data plane forwarding protocol, the instructions when executed by one or more processors causes the border network device to:
store a SR-MPLS policy comprising a SR-MPLS segment routing stack including one or more segment identifiers corresponding to respective nodes of the second forwarding domain and a binding segment identifier (B SID);
receive an Internet Protocol version 6 (IPv6) packet with a Destination Address including the BSID, the IPv6 packet further comprising a segment routing stack including one or more SRv6 segment routing identifiers;
responsive to receiving the IPv6 packet including the B SID, generate a Segment Routing (SR) Multiprotocol Label Switching (MPLS) packet by creating a SR-MPLS header with a label stack including the one or more segment identifiers of the SR-MPLS policy; and
encapsulating the IPv6 packet with the SR-MPLS header; and
send the SR-MPLS packet into the second forwarding domain of the network.

20. The computer readable medium of claim 19, wherein said received SRv6 packet includes a Segment Routing Header (SRH) including a Segment List including one or more SRv6 Segment Identifiers (SIDs) and a Segments Left identifying a next SID in the Segment List; and
wherein said invoked Segment Routing Interworking policy includes changing the Destination Address of the SRv6 packet to the next SID and decreasing a value of the Segments Left.

21. The computer readable medium of claim 20, wherein the network includes a third forwarding domain using a SRv6 data plane forwarding protocol and including a third network node having a network address of the next SID.

22. The computer readable medium of claim 21, wherein the network element is a path computation engine.

23. The computer readable medium of claim 19, wherein said invoked Segment Routing Interworking policy includes changing the Destination Address of the SRv6 packet to a different Internet Protocol version 6 (IPv6) address comprising a Segment Identifier (SID) included in said received SRv6 packet.

24. The computer readable medium of claim 23, wherein the network includes a third forwarding domain, using a SRv6 data plane forwarding protocol and including a third network node having a network address of the different IPv6 address.

25. The computer readable medium of claim 24, wherein the network element is a path computation engine.

26. The computer readable medium of claim 19, wherein the network element is a path computation engine.

27. The computer readable medium of claim 19, wherein the second forwarding domain includes a second path node associated with a MPLS label of said one or more MPLS labels; and
wherein the instructions which when executed by the one or more processors causes the border network device to advertise a route advertisement associating the second path node with the B SID.

* * * * *